United States Patent
Sakurai et al.

(10) Patent No.: US 7,203,969 B2
(45) Date of Patent: Apr. 10, 2007

(54) RECORDING MEDIUM, RECORDING-MEDIUM MANAGEMENT METHOD, AND RECORDING-MEDIUM MANAGEMENT SYSTEM

(75) Inventors: Masatoshi Sakurai, Tokyo (JP); Yoshiyuki Kamata, Tokyo (JP); Katsuyuki Naito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 761 days.

(21) Appl. No.: 10/606,788

(22) Filed: Jun. 27, 2003

(65) Prior Publication Data
US 2004/0107355 A1 Jun. 3, 2004

(30) Foreign Application Priority Data
Jun. 28, 2002 (JP) ............................. 2002-190264

(51) Int. Cl.
*G06F 11/00* (2006.01)
(52) U.S. Cl. .................. 726/34; 369/53.1; 720/719
(58) Field of Classification Search ................ 720/719; 726/34
See application file for complete search history.

(56) References Cited

U.S. PATENT DOCUMENTS
6,029,259 A * 2/2000 Sollish et al. ................ 714/719

(Continued)

FOREIGN PATENT DOCUMENTS
| | | |
|---|---|---|
| JP | 60-145501 | 8/1985 |
| JP | 9-73680 | 3/1997 |
| JP | 11-96673 | 4/1999 |

OTHER PUBLICATIONS
U.S. Appl. No. 11/092,682, filed Mar. 30, 2005, Sakurai et al.

(Continued)

*Primary Examiner*—Gilberto Barron, Jr.
*Assistant Examiner*—Devin Almeida
(74) *Attorney, Agent, or Firm*—Oblon, Spivak, McClelland, Maier & Neustadt, P.C.

(57) ABSTRACT

A recording-medium management system comprising: a reproduction part; a recording part; and a control part. The control part performs a first through fourth control. The first control is to obtain a first data line from an authentication region of a recording medium by making the reproduction part read the authentication region, the authentication region including a first data pattern of a RAM bit and a ROM bit, the first data line being corresponding to the first data pattern, the RAM bit being over-writable of data at least once by a first writing condition, and the ROM bit being not over-writable of data by the first writing condition. The second control is to make the recording part overwrite predetermined data to the RAM bit. The third control is to obtain a second data line from the recording-medium, the second data line being corresponding to a second data pattern of the over-written RAM bit and the ROM bit. The fourth control is to perform an authentication with regard to the recording medium in reference to the first and second data lines.

21 Claims, 17 Drawing Sheets

U.S. PATENT DOCUMENTS

| | | | |
|---|---|---|---|
| 2001/0018743 A1* | 8/2001 | Morishita | 713/193 |
| 2002/0100052 A1* | 7/2002 | Daniels | 725/87 |
| 2003/0002671 A1* | 1/2003 | Inchalik et al. | 380/202 |
| 2004/0107355 A1 | 6/2004 | Sakurai et al. | |

OTHER PUBLICATIONS

U.S. Appl. No. 10/606,788, filed Jun. 27, 2003, Sakurai et al.

U.S. Appl. No. 10/668,231, filed Sep. 24, 2003, Kikitsu et al.

Intel Corporation, IBMC, Matushita, Toshiba, Content Protection System Architecture, Revision 0.81, pp. 1-19, "A Comprehensive Framework for Content Protection", Feb. 17, 2000.

U.S. Appl. No. 11/493,807, filed Jul. 27, 2006, Hieda et al.

* cited by examiner

KEY A
"00101001"

OVERWRITE ERASE

KEY B
"10111011"

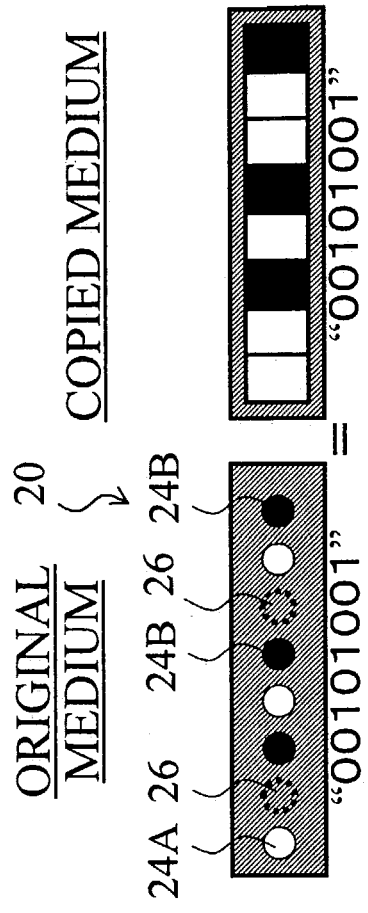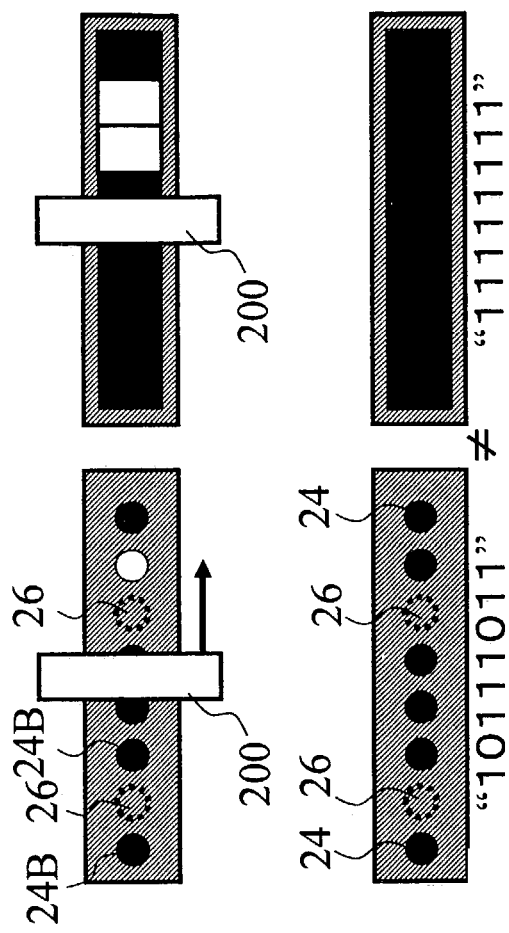

RECORDING MEDIUM, RECORDING-MEDIUM MANAGEMENT METHOD, AND RECORDING-MEDIUM MANAGEMENT SYSTEM

CROSS-REFERENCE TO RELATED APPLICATIONS

This application is based upon and claims the benefit of priority from the prior Japanese Patent Application No. 2002-190264, filed on Jun. 28, 2002; the entire contents of which are incorporated herein by reference.

BACKGROUND OF THE INVENTION

The present invention relates to a recording medium, a recording-medium management method and a recording-medium management system, and more particularly, it relates to a recording medium for managing decryption of contents which are stored in the recording medium, propriety of access, etc., to the recording-medium management method of performing authentication about this recording medium, and to the recording-medium management system that performs authentication etc. about the recording medium.

The technology of copy protection for protecting copyrights of a music software, video software, and application software, is becoming important with the spread of digitized data.

Particularly, a DVD (Digital Versatile Disc) video disc or a DVD-ROM disc etc. which adopts the digital recording system can be accompanied as representative examples of the software for which a copy protection is required. Encryption technology has been conventionally used for the copy protection to the video software of these digital recordings.

The copy protection method using encryption technology performs effectively about the DVD video disc or DVD-ROM disc with which the already encrypted data is recorded. However, in the case of DVD-RAM with which a user can record a new data, the following problems will arise.

(1) Management of the "encryption key" needed when encrypting is difficult.

(2) Since a powerful encryption is difficult for the data recording reproducing equipment (for example, DVD-RAM recorder which can perform recording and playback in digital like the analog video cartridge recorder which has spread widely) which is provided over a user's hand, a code is easy to be broken.

(3) In the case of a data recording reproducing equipment which can perform encryption and its decryption within the equipment, if the data is again encrypted with the original data recording playback equipment after decrypting the data which the user once created and encrypted with another data recording playback equipment, the contents of data to be protected against a copy can be copied easily.

Because of these problems, it is difficult to operate the copy protection using the conventional encryption technology effectively about the record playback equipment of digital video data.

Moreover, if an original copy protection processing is performed for a data recording medium for DVD-RAM by the DVD-RAM drive system, there will be a problem that a copy protection processing circuit becomes complicated when reproducing the medium with a DVD-ROM drive or reproducing a DVD-ROM disc with the DVD-RAM drive This also becomes the factor which increases the product cost of the DVD-RAM drive.

SUMMARY OF THE INVENTION

According to an embodiment of the invention, there is provided a recording medium comprising: an authentication region having a RAM bit and a ROM bit, the RAM bit being over-writable of data at least once by a first writing condition, and the ROM bit being not over-writable of data by the first condition; and a data storing region.

According to other embodiment of the invention, there is provided a recording-medium management method comprising: obtaining a first data line from an authentication region of a recording medium, the authentication region including a first data pattern of a RAM bit and a ROM bit, the first data line being corresponding to the first data pattern, the RAM bit being over-writable of data at least once by a first writing condition, and the ROM bit being not over-writable of data by the first writing condition; overwriting predetermined data to the RAM bit; obtaining a second data line from the recording medium, the second data line being corresponding to a second data pattern of the over-written RAM bit and the ROM bit, and decrypting an encrypted data stored in a data storing region of the recording medium in reference to the first and second data lines.

According to other embodiment of the invention, there is provided a recording-medium management method comprising: obtaining a first data line from an authentication region of a recording medium, the authentication region including a first data pattern of a RAM bit and a ROM bit, the first data line being corresponding to the first data pattern, the RAM bit being over-writable of data at least once by a first writing condition, and the ROM bit being not over-writable of data by the first writing condition; overwriting predetermined data to the RAM bit; obtaining a second data line from the recording medium, the second data line being corresponding to a second data pattern of the over-written RAM bit and the ROM bit, and judging propriety of an access to a data storing region of the recording-medium in reference to the first and second data lines.

According to other embodiment of the invention, there is provided a recording-medium management system comprising: a reproduction part; a recording part; and a control part performing a first control to obtain a first data line from an authentication region of a recording medium by making the reproduction part read the authentication region, the authentication region including a first data pattern of a RAM bit and a ROM bit, the first data line being corresponding to the first data pattern, the RAM bit being over-writable of data at least once by a first writing condition, and the ROM bit being not over-writable of data by the first writing condition; a second control to make the recording part overwrite predetermined data to the RAM bit; a third control to obtain a second data line from the recording-medium, the second data line being corresponding to a second data pattern of the over-written RAM bit and the ROM bit, and a fourth control to perform an authentication with regard to the recording medium in reference to the first and second data lines.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIGS. 4A through 4C are schematic diagrams showing the difference between the original medium and the copied medium mentioned above;

DETAILED DESCRIPTION

Hereafter, some embodiment of the invention will be explained, referring to drawings.

FIRST EXAMPLE

First, an example of the recording medium and an authentication method using the recording medium according to the embodiment of the invention will be explained.

Figure 1A:
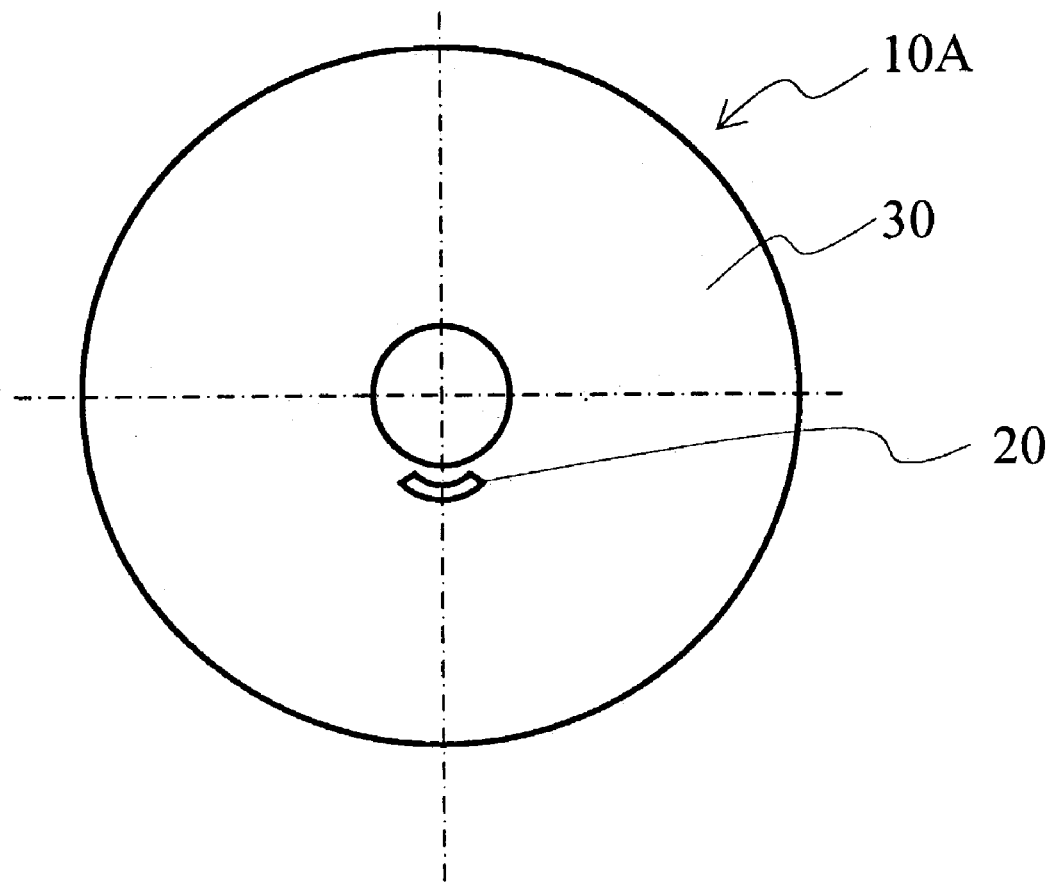
FIGS. 1A and 1B are schematic diagrams showing an example of the recording medium according to the embodiment of the invention.
Figure 1B:
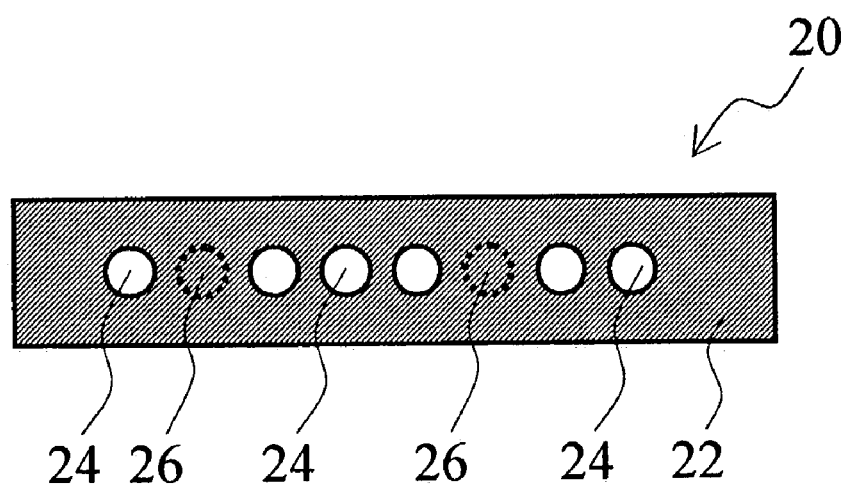

FIGS. 1A and 1B are schematic diagrams showing an example of the recording medium according to the embodiment of the invention.

That is, the disc-like recording medium is expressed in FIG. 1A. This disc is, for example, a recording medium using either of various kinds of recording modes, such as a hard disc, other magnetic discs, optical discs such as DVD and CD, and magneto-optical discs including MO (Magneto-optical) discs.

However, the form of the recording medium of the invention is not limited in the shape of a disc, but it can be used in various kinds of forms, such as the shape of a card, the shape of a tape, and the shape of a film, which will be explained in detail after. Furthermore, it is also possible to apply the invention to the recording medium provided with the so-called semiconductor memory.

Now, as expressed in FIG. 1A, the authentication region 20 is provided in recording medium 10A of the embodiment. Although the example in which one authentication region 20 is provided near the center of a disc-like medium is expressed in FIG. 1A, the position of the authentication region 20, or its number can be determined appropriately according to a use, as explained in detail after.

In the recording medium 10A, region other than the authentication region 20 is the data storing region 30, which, for example, can be the so-called ROM (read only memory) region where data can only read. However, this data storing region 30 may be so-called RAM (random access memory) region where data can be written and read, so-called write once region (write once memory) where data can written only once, or a region which combines any of the ROM region, the RAM region and the write once region.

And in one embodiment of the invention, the data stored in this data storing region 30 is encrypted as explained in detail after. And the "encryption key" for carrying out decryption of this encrypted data is stored in the authentication region 20.

Moreover, in another embodiment of the invention, a propriety judgment about various kinds of processes, such as access to the data stored in the data storing region 30, operation about this data, computation, and installation, is made based on the data stored in the authentication region 20. That is, when the data acquired in the authentication region 20 is not the predetermined contents, operation of application software, installation, a copy, etc. are forbidden.

FIG. 1B is a partly enlarged view of the authentication region 20. The authentication region 20 of the invention has the RAM bits 24, the ROM bits 26, and the non-recording region 22 that encloses the circumference of these bits. The non-recording region 22 is a region where a recording of information by the record playback head 200 is not performed. Although it is desirable for this non-recording region to be constituted by the material which cannot store information, it may consist of material which can store information.

And in this figure, the RAM bits 24 are the minimum units which can store information by the record playback head. That is, the RAM bits 24 are bits to which information can be recorded or can be overwritten by the record playback head etc.

Any materials which can store information by a certain technique can be used as material of the RAM bit 24. For example, the magnetic body which can store information magnetically, the phase change medium where the reflectivity of a light changes with crystal-amorphous phase transitions, various chromic materials where the color changes by electric fields, optical irradiation, heating, and oxidation-reduction reaction, materials whose form change and materials whose electric conduction, permittivity or optical transmissivity change, can be mentioned.

Furthermore, the material which can store information by accumulating an electric charge, like a semiconductor RAM memory can be used. The method with which information can be rewritten repeatedly using a reversible recording mode like magnetic recording can be used as the recording method to the RAM bits. Or the method with which information can be written only once using the irreversible recording mode of applying heat like a write once system can be used as the recording method to the RAM bits.

On the other hand, the ROM bits 26 are regions where information cannot be overwritten, or a region where information cannot be overwritten unless a different method from the RAM bit 24 is used. However, these ROM bits 26 are also bits whose information can be read by the record playback head etc, as well as the RAM bits 24. That is, the ROM bits 26 are regions which give "0" or "1", or the same information as the information on the last RAM bit or ROM bit.

The RAM bits 24 and the ROM bits 26 are arranged in the authentication region 20 at a certain fixed interval according to the reading clock frequency of record playback equipment. However, the interval can be appropriately determined according to the specific record reproduction system, and may not necessarily be a fixed interval.

And in the embodiment, at least one RAM bit 24 and one ROM bit 26 are provided in one authentication region 20, respectively. The number and the order of arrangement of these RAM bit 24 and the ROM bits 26 can be appropriately determined according to use. Moreover, the arrangement may not necessarily be the one dimensional arrangement as illustrated in FIG. 1B, but may be two dimensional along a predetermined plane, and also in the case of a multilayer recording medium etc., the three dimensional arrangement is also possible.

However, as for the arrangement pattern of the RAM bits 24 and the ROM bits 26 in the authentication region 20, it is desirable for it to be unable to predict.

That is, as for arrangement of the RAM bits and ROM bits in the authentication region 20, it is desirable not to change the arrangement by whether the bit is a RAM bit or a ROM bit, but to be arranged under a fixed rule for both of the bits. It is desirable that it is difficult to distinguish the ROM bit from the RAM bit only by accessing each bit in the authentication region 20 with the playback head or a recording head. Furthermore, it is desirable to make the prediction difficult by using two or more arrangement patterns at random for every disc.

For example, the arrangement pattern may be different for every recording medium. This is because the prediction of "key B" will become difficult and the reliability of a copy protection will become higher as explained in full detail later.

Hereafter, the authentication process which can be performed using such a recording medium will be explained.

Figure 2:
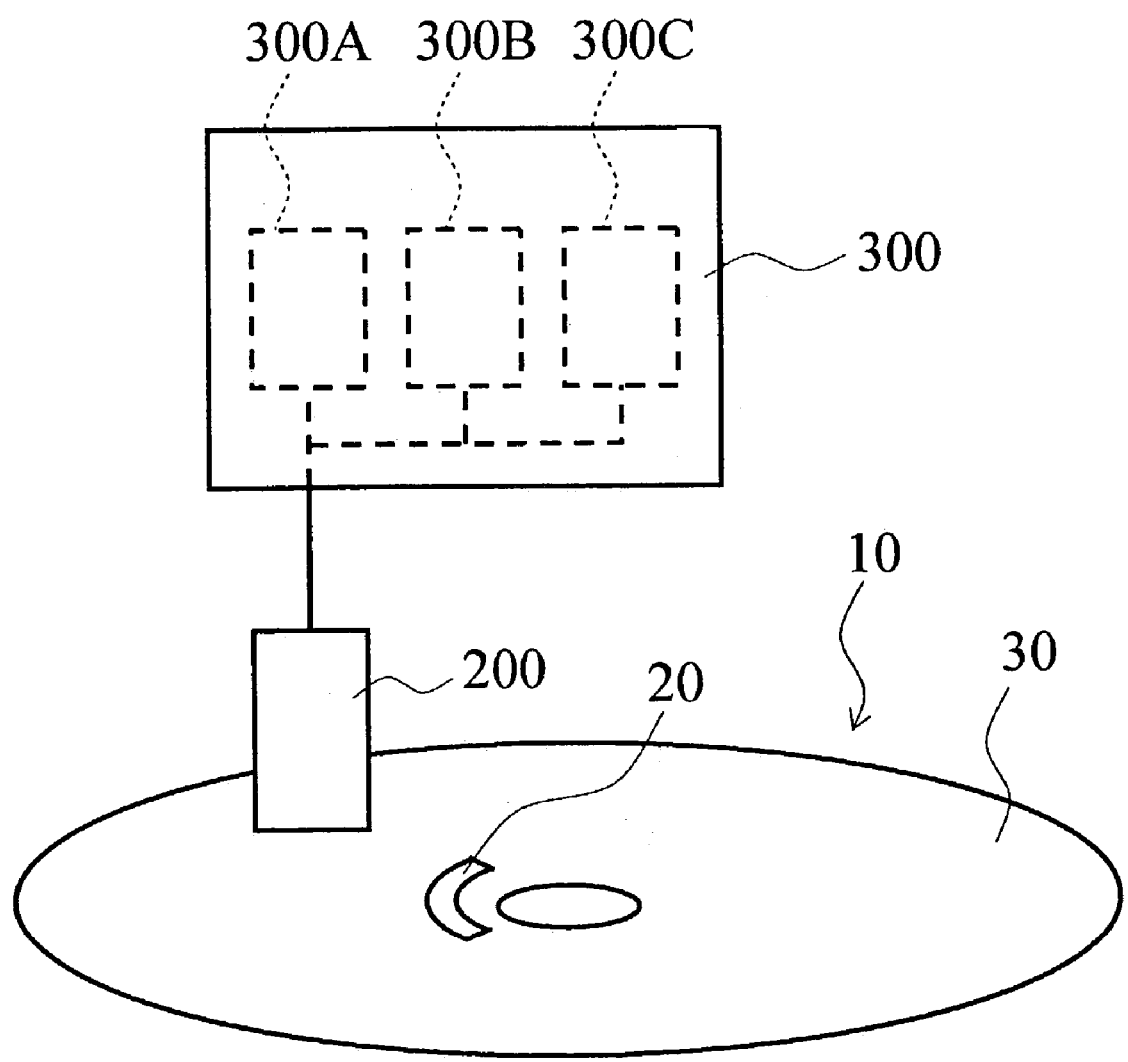
FIG. 2 is a schematic diagram showing the recording-medium management system concerning the embodiment of the invention.

FIG. 2 is a schematic diagram showing the recording-medium management system concerning the embodiment of the invention.

That is, this management system has the record playback head 200 which performs record and reproduction to a recording medium 10, and the control part 300 which performs read-out of data, writing, and data processing through this head 200 This management system may be playback equipment for reproducing the data stored in the data storing region 30 of a recording medium 10, or may be recording equipment which writes data in the data storing region 30.

Figure 3A:
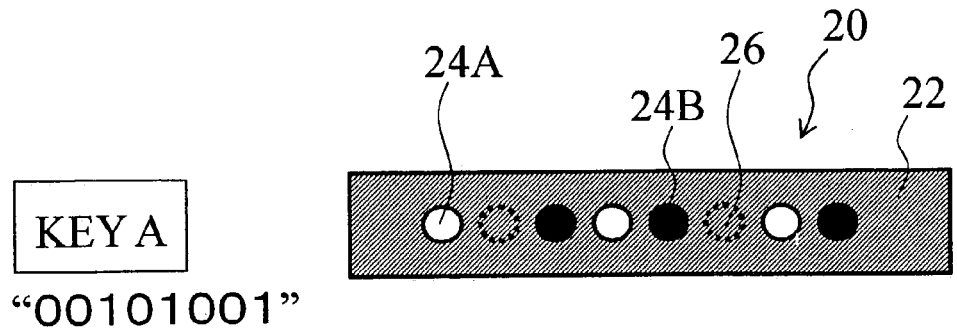
FIGS. 3A through 3C are schematic diagrams explaining the authentication method performed by a recording-medium management system.
Figure 3B:
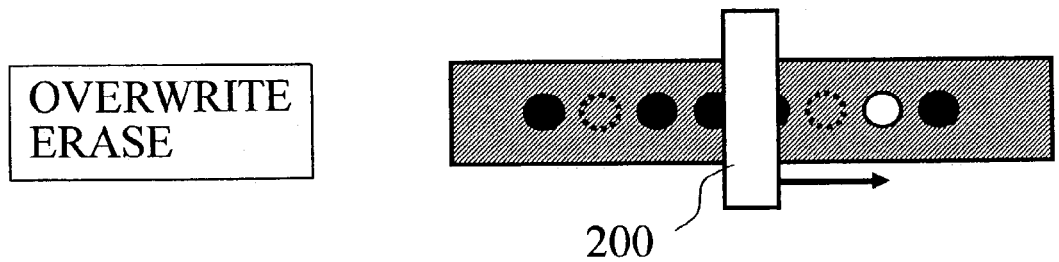
Figure 3C:
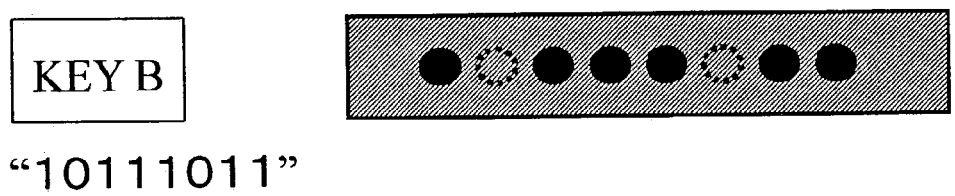

FIGS. 3A through 3C are schematic diagrams explaining the authentication method performed by a recording-medium management system.

That is, the processes of the authentication method of the invention includes the steps of "getting key A", an "overwrite erase", and "getting key B".

In the system shown in FIG. 2, these processes are performed, when the control part 300 operates the head 200 appropriately. The process of these three steps may be performed in the first through third control parts 300A, 300B, and 300C of the control part 300, respectively, as shown in FIG. 2.

Or the process of these three steps may be performed using the same region in the control part 300.

In this example, the case where it is possible for all the ROM bits 26 to be read as specific bit information, such as "0" and "1", by the record playback head 200 is accompanied as an example.

The states of the authentication region 20 in each step are expressed in FIG. 3A through FIG. 3C.

Here, the non-recording region 22 which encloses the circumference of the RAM bits 24 and the ROM bits 26 is a region where information cannot be recorded by the record playback head 200.

In FIGS. 3A through 3C, the white circle expresses for RAM bits 24A in which "0" is written, and the black dot expresses RAM bits 24B in which "1" is written.

The information on these RAM bits 24A and 24B can be overwritten when the record playback head 200 records information on these bits again.

In the authentication method of the embodiment, the information for getting "key A" is beforehand written in the authentication region 20.

FIG. 3A expresses the process of getting the "key A" in the embodiment. That is, in the authentication region 20, the RAM bits 24 (24A, 24B) in which "0" or "1" is written, and the ROM bits 26 are arranged. The record playback head 200 reads this region. In this example, it is supposed that the ROM bit 26 is read as "0." However, the invention is not limited to this example.

When the record playback head 200 reads the authentication region 20 in FIG. 3A, RAM bits 24A expressed with a white dot and the ROM bits 26 will be read as "0", and RAM bit 24B expressed with the black dot will be read with "1." That is, this authentication region 20 is read as "00101001." This is recognized as the "key A."

Next, an "overwrite erase" is performed as expressed in FIG. 3B. That is, after getting the "key A", the information "11111111" is overwritten by a recording head 200 to this authentication region 20.

As a result of a recording head's trying to write the signal showing "1" in all the bits in the authentication region 20 by this "overwrite erase" processing, all RAM bits 24A (white circle) showing "0" and RAM bits 24B (black dot) that expresses "1" in the authentication region 20 are replaced by bits 24B (black dot) showing "1." However, the information on the ROM bits 26 on this authentication region 20 does not change, and record of "0" is maintained in the example of FIG. 3B.

Next, "key B" is got as expressed in FIG. 3C. That is, when a playback head 200 reads the authentication region 20 again after the "overwrite erase" step, the bit data corresponding to "key B" are obtained.

Here, all RAM bits 24 in this authentication region 20 are bits 24B (black dot) which expresses "1" after the above-mentioned "overwrite erase" process, and on the other hand, there is no change in the ROM bits 26 showing "0." Therefore, the bit data "10111011" are read by the playback head 200, and this is recognized as the "key B."

The control part 300 expressed to FIG. 2 can generate the "key" used for encryption, decryption, or authentication, using both the "key A" and the "key B" read by the above procedure. And decryption processing of the code of the encrypted data which is recorded on the data storing region 30, i.e., a decipherment, is performed, using this key.

The method of generating the key using "key A" and "key B" may be a method of connecting the key A and Key B in order and using as one key, for example, and any other methods may be employed as well.

For example, only one encryption key may be generated from the "key A" and "key B." Two or more keys may be generated by obtaining one encryption key as "key C" by carrying out bit addition of "key A" and the "key B" and by obtaining a "key D" by carrying out bit subtraction of "key A" and the "key B".

The procedure of the encryption, decryption, and authentication using the key obtained from "key A" and "key B" of the invention is not limited to any specific one. General encryption or a general authentication means is disclosed by D. W. Davies and W. L. Price "Security for Computer Networks second edition" JOHN WILEY & SONS, William Stallings "Cryptography and Network Security Principles and Practice Second Edition" Prentice Hall.

For example, the key obtained from Key A and Key B of the embodiment can be used for the DES (Data Encryption Standard) method using a secret key, and the RSA (Rivest, Shamir and Adleman) method using a public key.

Moreover, when doing authentication work, the key of the embodiment can be used as MAC (Message Authentication Code).

By using the recording medium and the authentication method of the embodiment which were explained above, a powerful copy protection becomes possible.

That is, in the embodiment, since the authentication region 20 is the composition that the RAM bits 24 and the ROM bits 26 are intermingled as mentioned above, when the usual playback head 200 accesses this region, it is difficult to distinguish which bit is the ROM bit or the RAM bit in the authentication region 20.

Therefore, for example, when original recording medium 10A (for example, DVD-ROM) before performing authentication processing in the invention is copied to another copy recording medium (for example, DVD-RAM), the authentication region 20 is also copied together.

However, only the bit information stored in these RAM bits 24 and the ROM bits 26 is copied at this time, and the bit arrangement information of the RAM bits 24 and the ROM bits 26 is not copied.

Therefore, in a recording medium with the authentication region of the embodiment (original medium) and the recording medium which has the authentication region where arrangement of a RAM bit and a ROM bit differs from each other or which does not have the authentication region of the embodiment (copied medium), a result of authentication processing i.e., the acquisition result of "key A" and "key B" differs. In the copied recording medium in which all the data of an original medium are copied, all the regions where the authentication regions are copied are constituted by the RAM bit which can be overwritten.

If a process for getting "key A" is performed to this copied authentication region, the same key A as an original recording medium is acquirable.

However, following to this, if "overwrite erase" processing is performed to the authentication region of this copied medium, since all the bits in an authentication region in a copy medium are RAM bits, the pattern used for the overwrite erase will be recorded as it is.

Therefore, when "key B" is got next, since the pattern of an "overwrite erase" is written in as it is, as for the information currently recorded on the authentication region on a copied recording medium, an overwrite erase pattern is read.

On the other hand, since the RAM bits and the ROM bits are intermingled as above-mentioned in the authentication region of an original recording medium, also when an overwrite erase is performed, it cannot record on a ROM bit. Therefore, an overwrite erase pattern and the pattern of Key B are different.

That is, since the "keys B" obtained differs with an original recording medium and a copied recording medium, the "key B" decipherable in an original recording medium cannot be obtained in a copied recording medium. Therefore, in the copied recording medium, decryption of the data stored in the data storing region 30 cannot be performed, and contents cannot be reproduced.

FIGS. 4A through 4C are schematic diagrams showing the difference between the original medium and the copied medium mentioned above.

In the figures, getting the "key" in the authentication region 20 on an original medium is the same as the example expressed in FIGS. 3A through 3C. That is, "00101001" is obtained as "a key A", "11111111" is written in an authentication region in an "overwrite erase", and "10111011" is obtained as "a key B" in the original medium.

On the other hand, since "key A" is copied as it is in the authentication region on the copied medium, the same "00101001" as an original medium is obtained as "a key A" as expressed in FIG. 4A.

Next, when the "overwrite erase" by "11111111" patterns is performed on the copied medium as expressed in FIG. 4B, since all bits consist of RAM bits, all the bits of an authentication region will be overwritten by this pattern. Therefore, in the getting process of the "key B" following this, the bit pattern of an overwrite erase is acquired as "a key B" as it is on the copied medium, and "11111111" is obtained.

That is, in an original medium, since the ROM bits 26 are provided, "key B" is set to "10111011" different from the pattern of an overwrite erase. However, in the copied medium, it is the "11111111" which is same as an overwrite erase pattern, and the correct "key B" is not obtained. Therefore, decryption of the encrypted data recorded on the data storing region 30 becomes impossible in a copied medium.

In above-mentioned explanation, the example in which decryption processing of the encrypted data stored in the data storing region 30 is performed using "key A" and "key B" was given. But the invention is not limited to this example.

For example, by using the "key A" and "key B", the propriety of reproduction operation of the contents stored in the data storing region 30 may be determined, and propriety of installation of application software and the execution operation which are stored in the data storing region 30 may be determined.

In these cases, the data corresponding to "key A" and "key B" are stored also in the data storing region 30. And only when the "key A" and "key B" obtained in the authentication region 20, and these correspondence data stored in the data storing region 30 agree, reproduction of the contents stored in the data storing region 30, execution of application software or installation, etc. can be permitted.

SECOND EXAMPLE

Next, an example in which the ROM bit 26 is read as the same bit data as the data of the bit in the immediately preceding of that in the authentication region 20 will be explained.

The pattern of the "overwrite erase" in the embodiment does not need to be the continuation of the same bit data like "0000 . . . " and "11111 . . . " as shown in the first example, but may be set by the signal characteristic acquired from the ROM bits 26 in the record reproduction system using the invention.

For example, when using the optical recording medium such as CD, DVD, etc., the intensity of the reflected light from each bit is recognized as a bit signal respectively in many cases. That is, the method of reading of treating it as the signal of "1" if it is more than a threshold with intensity, and treating it as the signal of "0" if smaller than a threshold is used. Thus, when recognizing the information from each bit by a fixed threshold, it is effective to make an overwrite erase signal continuation of the same bit signals, such as "0000 . . . " and "1111 . . . " described before.

On the other hand, in the case of HDD (Hard Disc Drive) etc., the ROM bits on a magnetic information recording medium may be regions without magnetic information. In this case, the signal from such ROM bits is recognized to be the same signal as the signal from the bit read immediately before on the characteristic of magnetic reading heads, such as a GMR (giant magneto-resistance effect) head.

For example, in an authentication region, if the immediately preceding bit of a ROM bit is "0", the ROM bit will also be recognized to be "0."

In this case, as a pattern used for an "overwrite erase", the pattern in which the same signal continued as shown in "1111 . . . " of a precedent is not desirable. Because, when the overwrite erase of the authentication region where the RAM bits and ROM bits in the embodiment are intermingled is carried out by the continuation pattern of the signal same like "111 . . . ", since "1" is recorded as for all RAM bits, and the same signal as the last bit is recognized to a ROM bit, wherever the ROM bit may be in an authentication region "1111 . . . " equal to an overwrite erase pattern will be obtained as "key B".

Thus, as for the pattern used for an overwrite erase, in the case of a system which recognizes a ROM bit to be the same data as the bit read just before, it is desirable to make it the bit-data sequence in which different bit data appears by turns like "010101 . . . ".

Figure 5A:
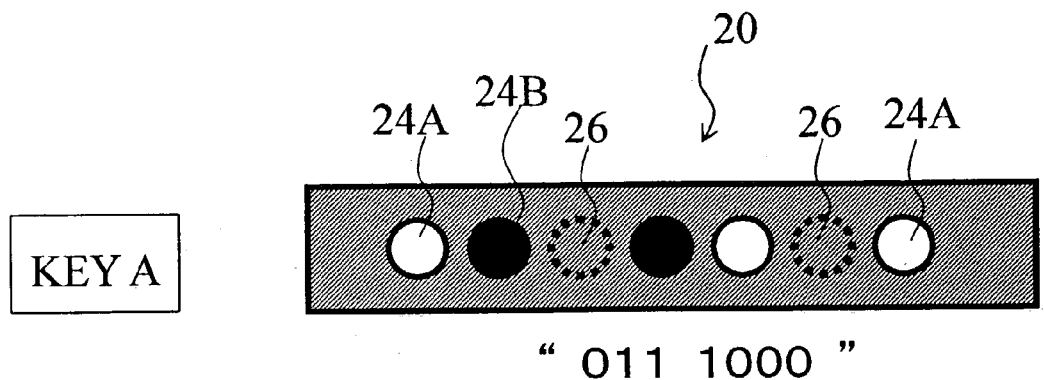
FIGS. 5A through 5C are schematic diagrams which illustrate the authentication process in a system like HDD.
Figure 5B:
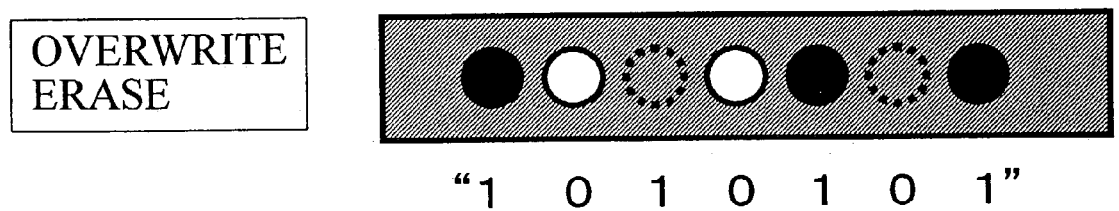
Figure 5C:
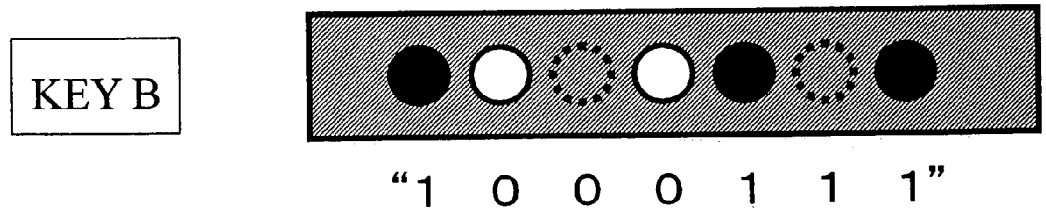

FIGS. 5A through 5C are schematic diagrams which illustrate the authentication process in a system like HDD.

In FIG. 5A, when acquiring "key A", the ROM bits 26 of the authentication region 20, i.e., the 3rd and the 6th record bits from the left in the figure, are read as equal to the bits in front of that. That is, "0111000" is obtained as "key A."

Next, as expressed in FIG. 5B, an overwrite erase is performed using the bit pattern arranged "1010101", "1", and "0" by turns.

Then, in the case of read-out of "key B", as expressed in FIG. 5C, since it supposes that the ROM bits 26 are equal to the immediately preceding bit, "1000111" is obtained as "a key B."

Thus, since "key B" serves as different bit data from an overwrite erase pattern "1010101", if this overwrite pattern is used, it can be distinguished from the "key B" generated by the recognition region copied on the copied medium, and will become effective as a copy protection.

Thus, as for the overwrite pattern used when an "overwrite erase", it is desirable to be appropriately determined according to the characteristic of the system how the RAM bits 24 and the ROM bits 26 are read. That is, it is chosen appropriately whether an overwrite pattern is made continuation of the same bit data, or it is made a different combination of bit data. In addition, in this example, "11111111" and "1010101" were used as an overwrite pattern. However, the invention is not limited to this, but if it becomes the bit data with which an overwrite pattern differs from "key B", any overwrite patterns can be used.

THIRD EXAMPLE

Next, the example using the recording medium which has two or more authentication regions as the third example of the invention will be explained.

That is, by the authentication method of the invention, after performing the overwrite erase contained in the process of the authentication method, it becomes impossible to investigate what kind of information of key A was written before the overwrite erase to the RAM bits on the recording medium. Therefore, in the embodiment, when the same authentication region is used, it is impossible to carry out authentication repeatedly without "restoration processing" mentioned later.

That is, the embodiment has the feature that the authentication procedure using one authentication region is possible only for once, without carrying out "restoration processing."

If this feature is used, it will become possible to restrict the number of times of reference of the contents recorded on the recording medium.

For example, suppose that one movie contents are recorded on the data storing region 30 of recording-medium 10A, and these movie contents are encrypted. And, suppose that the encryption key is generated using "key A" and "key B", and the "key A" and "key B" are recorded on the authentication region 20.

When reproducing the movie contents of this recording medium 10A, a series of process of getting "key A", an "overwrite erase", and "key B" is carried out to the authentication region 20 according to the procedure mentioned above. And, "key A" and "key B" are acquired, an encryption key is obtained from these, contents are decrypted, and access and reproduction to contents are attained.

However, if the authentication procedure is preformed again, acquisition of "key A" becomes impossible because "overwrite erase" has already been performed.

Therefore, it becomes impossible to carry out authentication work once again and to access contents to the medium for which contents have been accessed once. That is, the feature that contents can be accessed only once is realizable.

Using this feature that an authentication process can be performed only once until one authentication region performs reproduction processing mentioned later, if two or more authentication regions are made to correspond to one contents the access restriction function in which contents can be accessed to only the number of times of the number of that authentication region can be offered.

Figure 6:
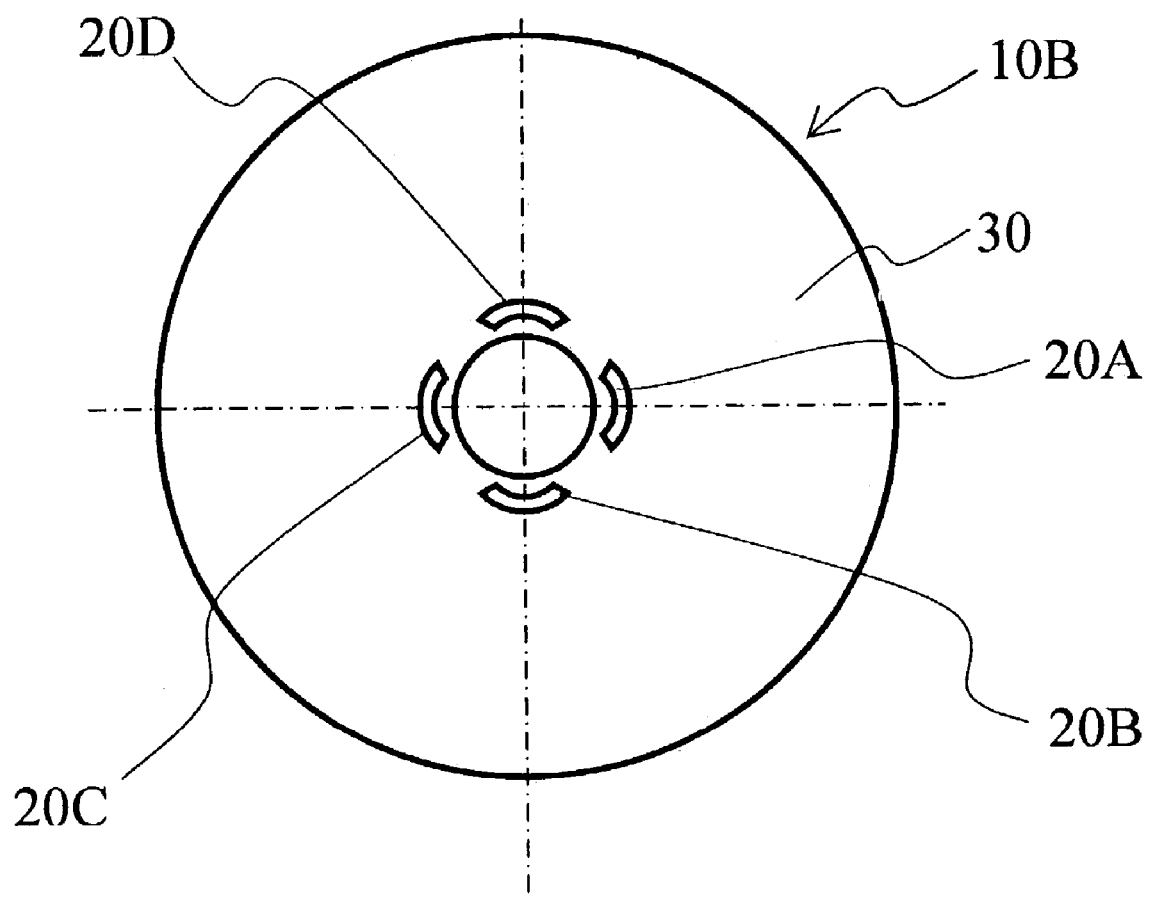
FIG. 6 is a schematic diagram which illustrates the recording medium which has two or more authentication regions.

FIG. 6 is a schematic diagram which illustrates the recording medium which has two or more authentication regions. That is, recording-medium 10B of this example has four authentication regions 20A–20D.

For example, if an encrypted movie contents are stored in the data storing region 30 of this recording medium and "key A" and "key B" are stored in the authentication regions 20A–20D respectively, it will become possible to carry out the authentication work four times, that is, to reproduce movie contents four times.

In this case, the four "keys A" and "keys B" which are stored in the authentication regions may be completely the same or are different from each other among four authentication regions 20A–20D. In other words, the arrangement pattern of the RAM bits and ROM bits in each authentication region, and the signal prerecorded on the RAM bits may be completely same or may be different for each authentication region. That is, "key A" and "key B" may be changed for every authentication region, or may be same for every authentication region.

And, for example, if one contents are divided into two or more chapters and either of the authentication regions 20A–20D is assigned to each chapter, it becomes possible to access each of chapter after a set period of time without accessing the whole contents at once.

In addition, in the embodiment, also about the number or the arrangement of the authentication regions established in a recording medium, it is not limited to the example shown in FIG. 6, but can be appropriately determined according to a use.

FOURTH EXAMPLE

Next, "restoration processing" which returns an authentication region to the state before an overwrite erase will be explained as the fourth example of the invention.

In the recording medium of the embodiment, the authentication region after the authentication process is performed is considered to be the state where the overwrite erase is carried out, as mentioned above about FIGS. 3A through 5C. Therefore, an authentication process is unrepeatable once again with this state.

Then, if the data of "key A" is written in an authentication region once again, an authentication process can be performed again. Such a process of the writing "key A" will be called "restoration processing." This restoration processing can be performed using a recording-medium management system which expressed in FIG. 2.

When the position of the authentication region on a recording medium is known (for example, when a track, a sector, etc. on which an authentication region is arranged are decided), it is possible to perform restoration processing by simple write-in processing.

On the other hand, when the position of an authentication region is not known on a recording medium, it is necessary to look for an authentication region on a medium by making arrangement of the RAM bit 24 and the ROM bit 26 the clue. Therefore, in this case, the record system with which RAM bits and ROM bits can be distinguished and identified on a recording medium, a recognition region can be judged after an appropriate time, and the predetermined "key A" can be written is needed.

Figure 7:
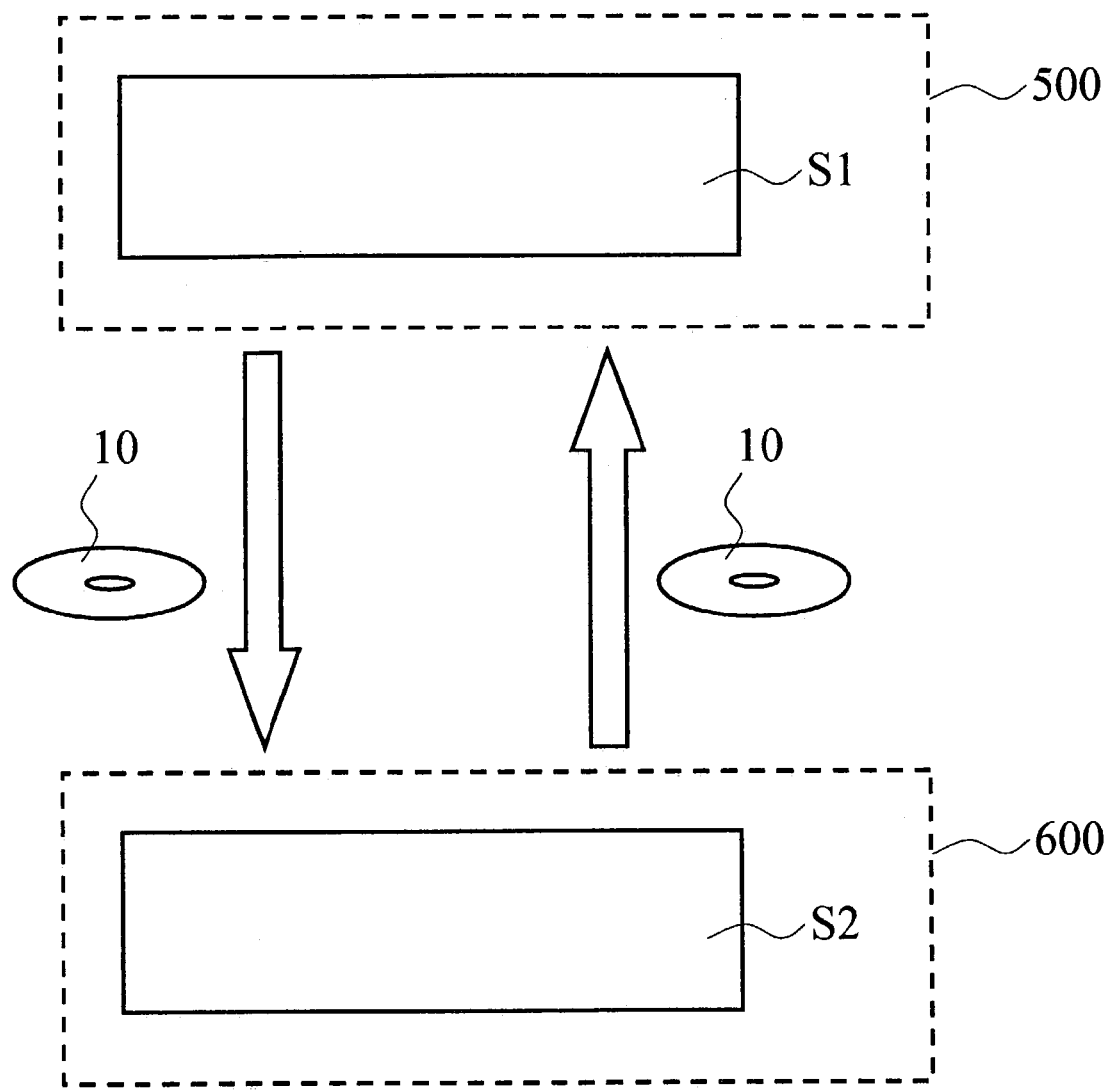
FIG. 7 is a schematic diagram showing the example of application of restoration processing.

FIG. 7 is a schematic diagram showing the example of application of restoration processing. That is, this figure expresses the restoration processing in a video rental shop 500.

A video rental shop 500 has the recording medium 10 with the authentication region of the invention, and restoration equipment S1 which can restore this authentication region.

On the other hand, a user 600 has playback equipment S2 which can carry out the authentication work of the invention.

In a video rental shop 500, the record media 10 which had the authentication region restored by restoration equipment S1 are lent to a user 600.

A user 600 needs to carry out authentication work in order to access the encrypted contents, when perusing the lent record media 10 with the playback equipment S2 which the user owns. And a user 600 carries out authentication work, obtains an encryption key from "key A" and "key B", and accesses contents.

Since the overwrite erase of the authentication region used for the authentication work is carried out once the authentication work is performed, it becomes impossible to do authentication work again as it is.

Since the key which the playback equipment S2 which a user 600 owns read at the time of authentication can decrypt the data corresponding to the authentication region any number of times as far as the playback equipment S2 has memorized the key, it is disadvantage to the realization of prohibition of two or more authentication in the invention. Therefore, it is desirable to have the system which eliminates the memory which saved the "key A" and "key B" read in the authentication region in a user's playback equipment S2 in the invention.

As for delete of memory of this the "key A" and "key B", it is desirable to be carried out when a certain fixed phenomenon occurs. The moment when playback equipment S2 deletes "key A" and "key B" may be, for example, the moment when reading of all data from the recording medium 10 equipped with the authentication region is finished, the moment when its recording medium is picked out from playback equipment S2, the moment of when using playback equipment S2 is finished, or the moment of when the a stop switch and a power supply off-switch are pushed. However, the moments when playback equipment S2 deletes "key A" and "key B" are not limited to the above-mentioned moments.

The user 600 returns the recording medium 10 to the video rental shop 500 after referencing contents. In the video rental shop 500, a user can be again provided with the recording medium 10 in the state in which authentication work can be carried out again by returning the authentication region of the returned recording medium 10 to the state in which "key A" can be acquired again with restoration equipment S1.

THE FIFTH EXAMPLE

Next, an example will be given and explained about the fabrication method of the recording medium of the invention as the fifth example of the invention.

The authentication region in the invention is a region where the RAM bits 24 and the ROM bits 26 are intermingled. As a method of creating this region, firstly the method of creating RAM bits arrangement at the predetermined intervals on the recording medium, secondly changing a specific RAM bit into the ROM bit which cannot be written in by carrying out destruction or property modification can be mentioned. By this technique, since the authentication region of a medium is drawn directly, a different authentication region for every medium can be created, unlike the sixth example mentioned later.

Hereafter, the manufacturing method of the recording medium of this example will be explained, referring to drawings.

FIGS. 8A through 8F are process sectional views showing the manufacturing method of the recording medium in this example.

Figure 8A:
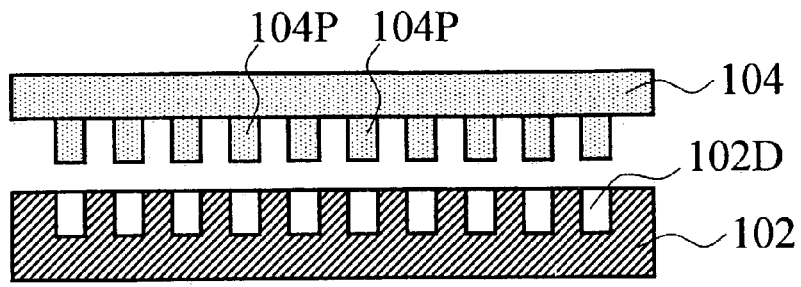
FIGS. 8A through 8F are process sectional views showing the manufacturing method of the recording medium in this example.

First, as shown in FIG. 8A, nickel is plated to original recording medium 102 and the stamper 104 is formed. That is, an electron beam resist is applied on the silicon substrate of larger size than medium size, and the openings of the resist are formed in the bit positions of the medium by electron beam drawing.

Then, RIE (Reactive Ion Etching) processing is performed and the original recording medium 102 having concave dot patterns 102D is created. Electroforming processing of nickel is performed to this original recording medium 102, and the stamper 104 made from nickel is formed. The nickel stamper 104 has convex parts 104P corresponding to the bit positions of a medium.

Figure 8B:
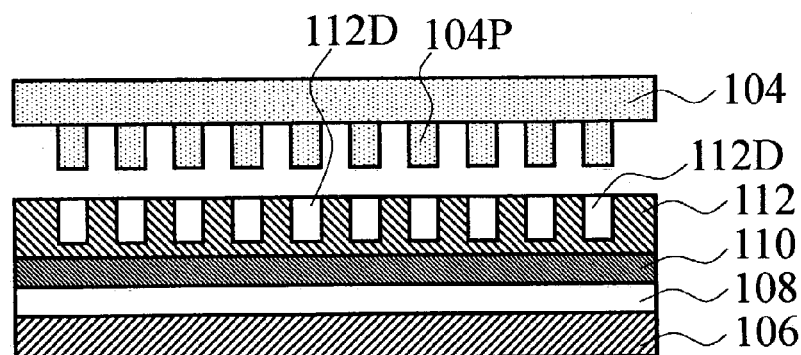
Figure 8C:
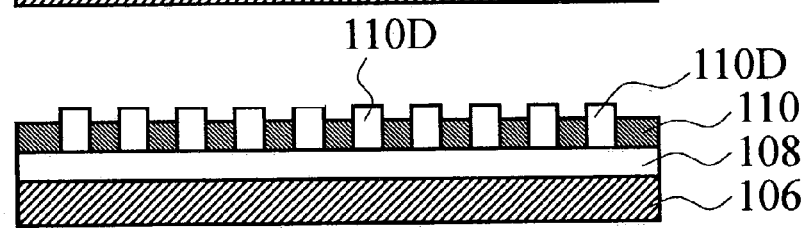

Next, as shown in FIG. 8B, the Pt reflective film 108 with a thickness of about 30 nm on the glass substrate 106, Al2O3 film 110 with a thickness of about 50 nm to be a matrix, and the resist film 112 with a thickness of about 50 nm are formed. And the resist 112 surface was processed using nano-imprint lithography by pressing the stamper 104 against the surface of the resist film 112, and recesses 112D corresponding to the bit position of a medium are formed. Next, as shown in FIG. 8C, the resist film 112 is etched by RIE and the surface form of a resist 112 is transferred on the matrix film 110. That is, recess 110D corresponding to the bit position of a medium is transferred by the surface of the matrix film 110.

Figure 8D:
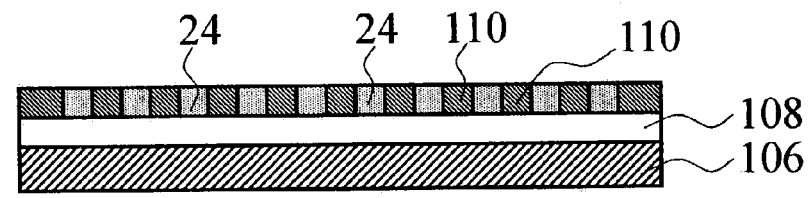

Next, as shown in FIG. 8D, the RAM bits 24 are formed and the planarizing of the surface is carried out. That is, the RAM bits 24 are formed by forming phase change material In—Sb—Te with a thickness of about 30 nm as a film and embedding at the holes.

Then, the surface is ground by CMP (chemical mechanical polishing), and carried out the planarizing.

Figure 9A:
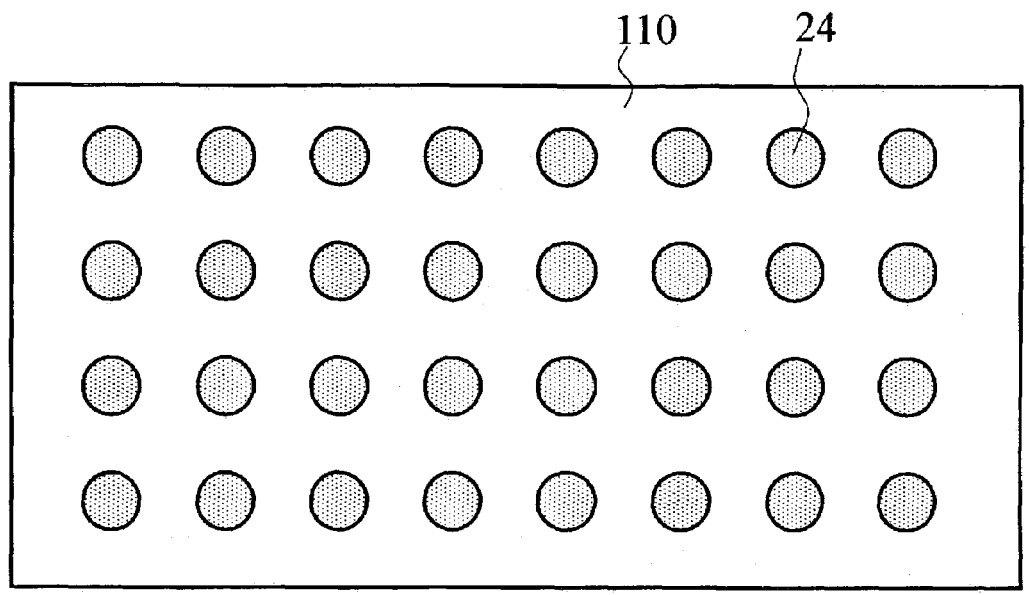
FIG. 9A is a schematic diagram showing the result of having observed the surface of the sample by the evanescent light microscope.

FIG. 9A is a schematic diagram showing the result of having observed the surface of the sample which is formed in this way by the evanescent light microscope. As shown in FIG. 9A, the RAM bits 24 are located in a line at equal intervals in Al2O3 matrix 110.

Figure 8E:
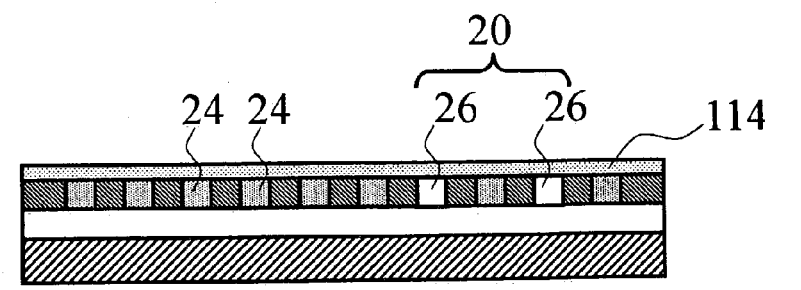

Then, ROM bits are formed by making parts of RAM bits into ROM bits following formation of the above aggregates of the RAM bits 24. That is, as shown in FIG. 8E, the ROM bits 26 are formed by removing specific RAM bits. On the obtained recording medium, the portion in which the eight RAM bits 24 of a predetermined region arranged on a track is considered to be the authentication region 20, and In—Sb—Te of the predetermined RAM bits 24 of this portion are heated by the electron beam heating, and removed. And the protective film 114 is formed on it.

Figure 8F:
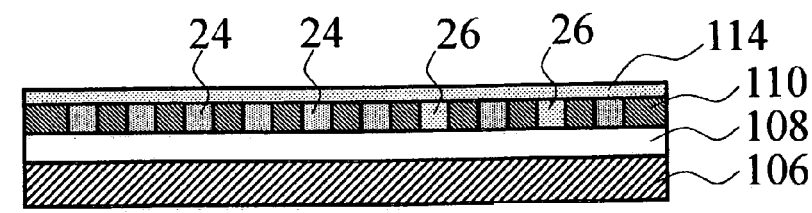

Alternatively, as shown in FIG. 8F, a different material may be embedded into the portions where the RAM bits are removed in order to make ROM bits 26. For example, a protective film 114 or any other material may be embedded into the portion where the RAM bits 24 are removed.

Figure 9B:
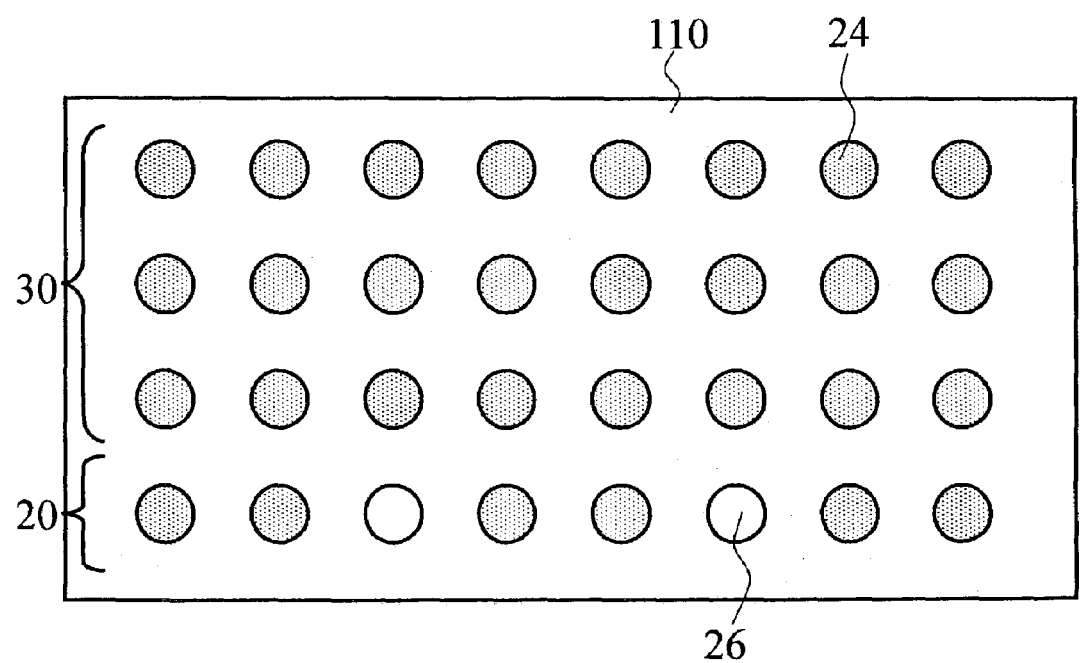
FIG. 9B is a schematic diagram showing the result of having observed the surface of the sample by the evanescent light microscope.

FIG. 9B is a schematic diagram showing the result of having observed the surface of the sample formed in this way by the evanescent light microscope. The record region 30 and the authentication region 20 where the RAM bits 24 and ROM bits 26 aligned are observed in the matrix 110.

The first bit, the second bit, the fourth bit, the fifth bit, the seventh bit, and the eighth bit of the authentication region 20, are the same RAM bits 24 as the RAM bit 24 of a record region. Third bit and the sixth bit of the authentication region 20 are the ROM bits 26 formed by removing the phase change material.

Figure 10:
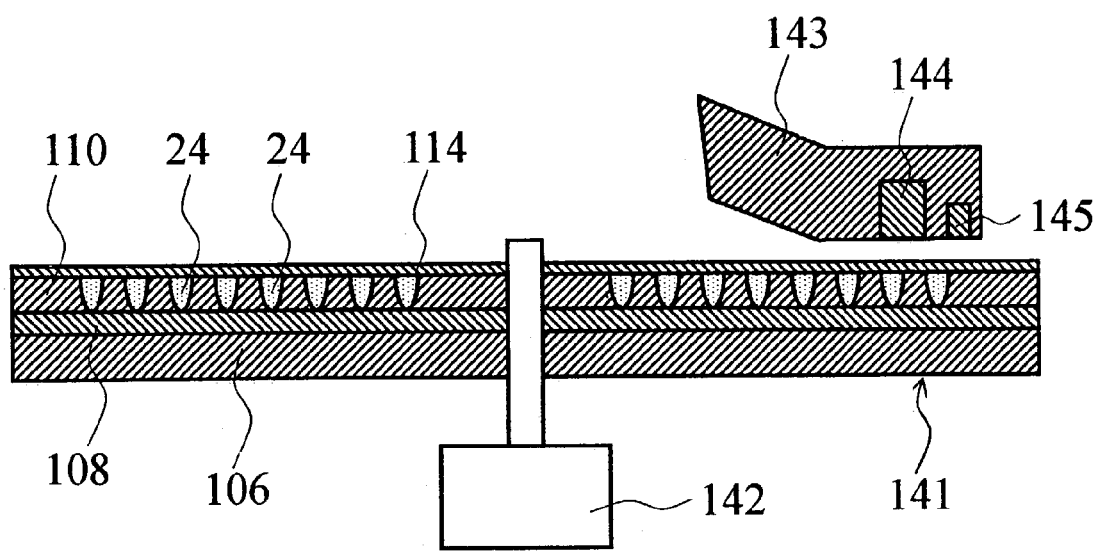
FIG. 10 is a sectional view showing a recording medium and the head slider of optical record playback equipment.
Figure 11:
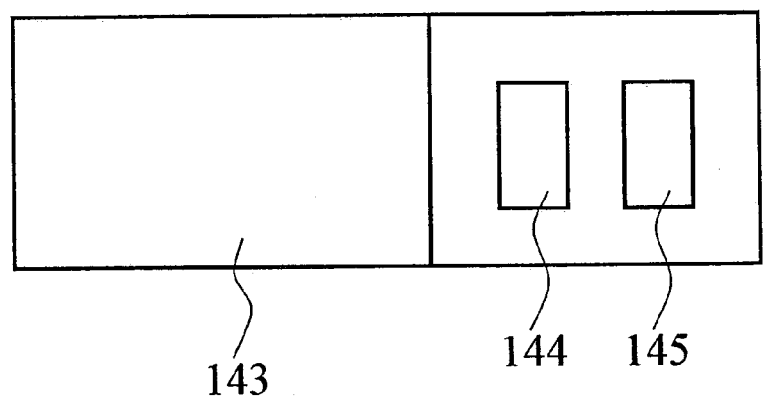
FIG. 11 is a diagram showing the plane structure of minute openings provided in the head slider.

FIGS. 10 and 11 are schematic diagrams showing the principal part of the recording-medium management system as phase change light record playback equipment which can reproduce the recording medium of this example.

That is, FIG. 10 is a sectional view showing a recording medium and the head slider of optical record playback equipment. The recording medium 141 of this example has the recording layer which has the record track belt in which the RAM bits 24 carried out rule arrangement on the glass substrate 106, and the protection layer 114.

This recording medium 141 is equipped with the spindle motor 142, and rotates with the control signal from the control part which is not illustrated. The optical laser resonance type detection read-out head 144 and the field oscillation type laser write-in head 145 are provided at the tip of the head slider 143.

The position of the head slider 143 is determined by the two-step actuator which is not shown.

FIG. 11 is a diagram showing the plane structure of minute openings provided in the head slider. Here, the size of the length of the minute opening of the read-out head 144 is about 35 nm, and the size of width of that is about 20 nm. The size of the length of the minute opening of the write-in head 145 is about 20 nm, and the size of width of that is about 20 nm.

This recording playback equipment can perform seeking operation, acquisition of "key A", an overwrite erase, acquisition of "key B", record read-out about other record bits, tracking of a read-out head, and evasion operation of the writing to a defective region, to the RAM bits 24 and the ROM bits 26, of the patterned recording medium 141, and other record bits.

As a result of performing an authentication process using an overwrite erase pattern "11111111" with the technique of the first example mentioned above to the recording medium of this example using this record playback equipment, "key A" and "key B" are acquired.

Moreover, by the copied medium formed by copying this recording medium to a RAM medium, it has checked that it could not reproduce.

THE SIXTH EXAMPLE

Next, an example is given and explained about another creation method of the recording medium of the invention as the sixth example of the invention.

That is, in this example, in the region in which the bit on a recording medium is not formed, the RAM bits 24 are created in specific arrangement into the specific portion, and the portion in which the RAM bits 24 are not formed is made into the ROM bits 26.

Specifically, the authentication region is drawn in the case of the original recording creation in the nano-imprint technique. By this technique, all of the stampers obtained from original recording medium and the recording media obtained from these stampers have the authentication region of the same pattern.

FIGS. 12A through 12D are process sectional views showing the principal part of the manufacturing method of the recording medium in this example.

First, the resist is applied on the silicon substrate and the bit pattern is drawn into the RAM bit portions of a medium by electron beam drawing. At this time, a bit pattern is not drawn into the portion equivalent to the ROM bits of the authentication region.

Figure 12A:
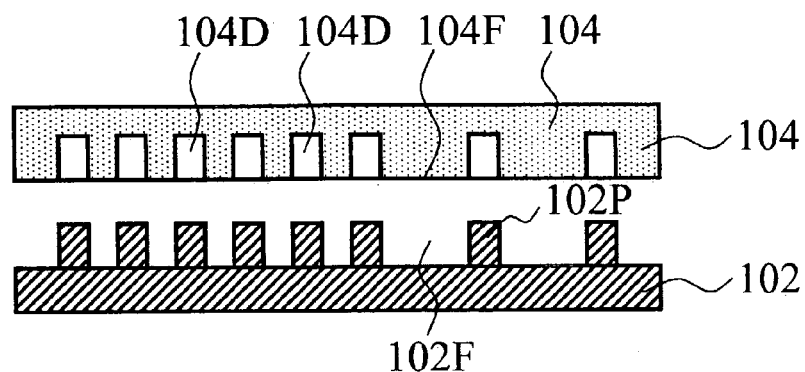
FIGS. 12A through 12D are process sectional views showing the principal part of the manufacturing method of the recording medium in the example.

RIE processing is performed to this silicon substrate, and original recording medium 102 is formed. In the surface of original recording 102, convex parts 102P are provided in the portions corresponding to RAM bits, and flatness parts 102F are provided in the portion corresponding to ROM bits. And as shown in FIG. 12A, nickel electroforming processing is performed to this original recording 102, and the stamper 104 is formed.

The stamper 104 has recesses 104D corresponding to RAM bits. Moreover, flatness parts 104F are formed in the portion corresponding to ROM bits.

Figure 12B:
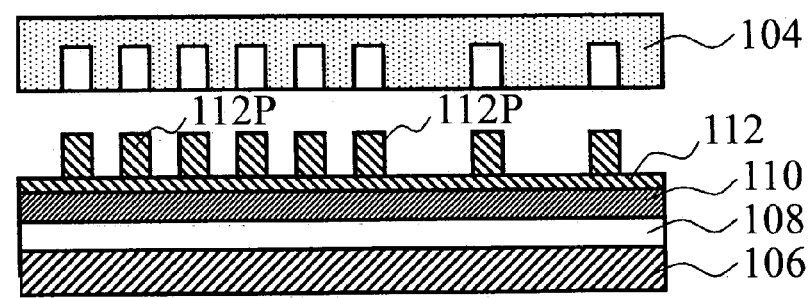

Next, as shown in FIG. 12B, the pattern of the stamper 104 is transferred. That is, the magnetic layer 116, which consists of a Pd base layer 108 with a thickness of about 30 nm and vertical magnetic recording material CoCrPt with a thickness of about 50 nm, is formed as films on a glass substrate 106.

Furthermore, the resist film 112 with a thickness of about 50 nm is formed as a film on the magnetic layer 116. The stamper 104 is forced on this surface, the resist film 112 is processed with nano-imprinting lithography, and the dot pattern whose portion corresponding to RAM bits acts as convex parts 112P is transferred.

Figure 12C:
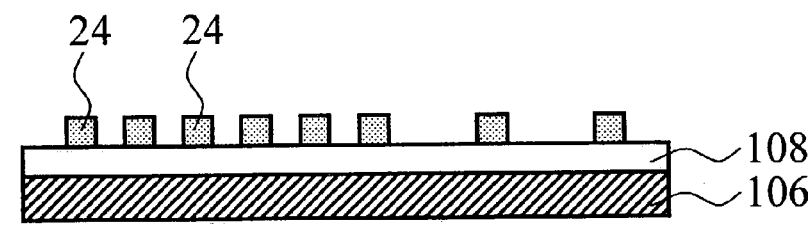
Figure 12D:
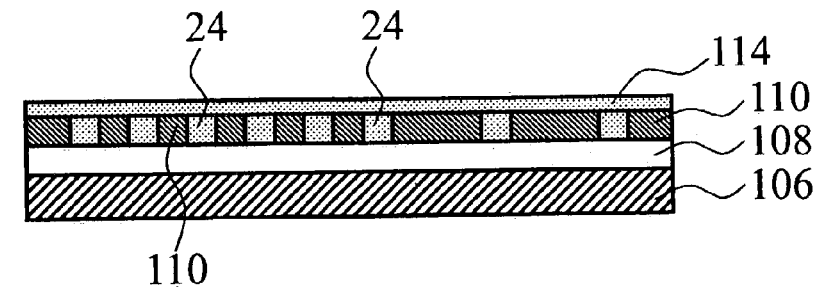

Next, as shown in FIG. 12C, the resist pattern 112 and the magnetic layer 116 are etched by Ar ion milling, and the magnetic body dots 24 which consist of CoCrPt are formed. Next, as shown in FIG. 12D, a matrix 110 is formed between the magnetic dots 24, and the planarizing of the surface is carried out. That is, a matrix 110 is formed by forming SiO2 film with a thickness of about 50 nm as a film on the whole surface, and embedding between the magnetic body dots 24. And the surface of SiO2 film is ground by CMP (chemical mechanical polishing), and carried out the planarizing. Then, diamond-like carbon (DLC) is formed as a film on the whole surface as the protective film 114.

Figure 13:
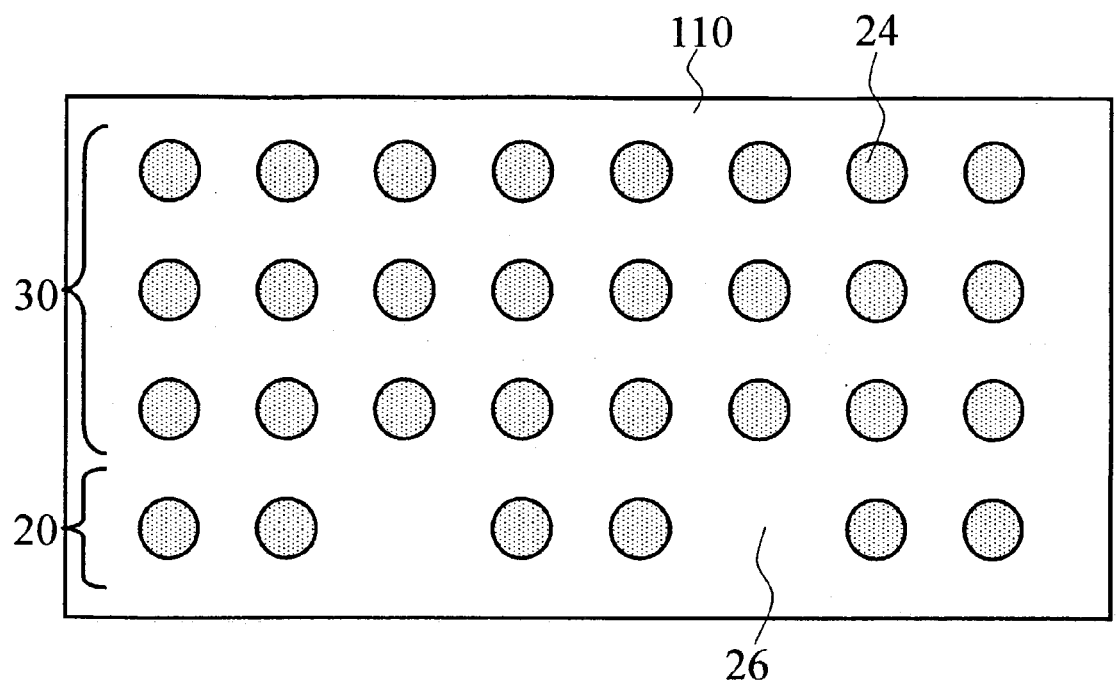
FIG. 13 is a schematic diagram showing the result of having observed the surface of the sample using MFM (Magnetic Force Microscope)

As shown in FIG. 13, when this substrate surface is observed using MFM (Magnetic Force Microscope), the record region 30 and the authentication region 20 are observed. In the record region 30, the RAM bits 24 are regularly located in a line in the matrix 110. In the authentication region 20, the matrix region 110 and the RAM bits 24, which can be written in magnetically is observed.

Moreover, in the authentication region 20, the dots of the RAM bits 24 did not exist in the portions corresponding to the ROM bits in which it can not be written, but being covered with the matrix 110 is observed.

Figure 14:
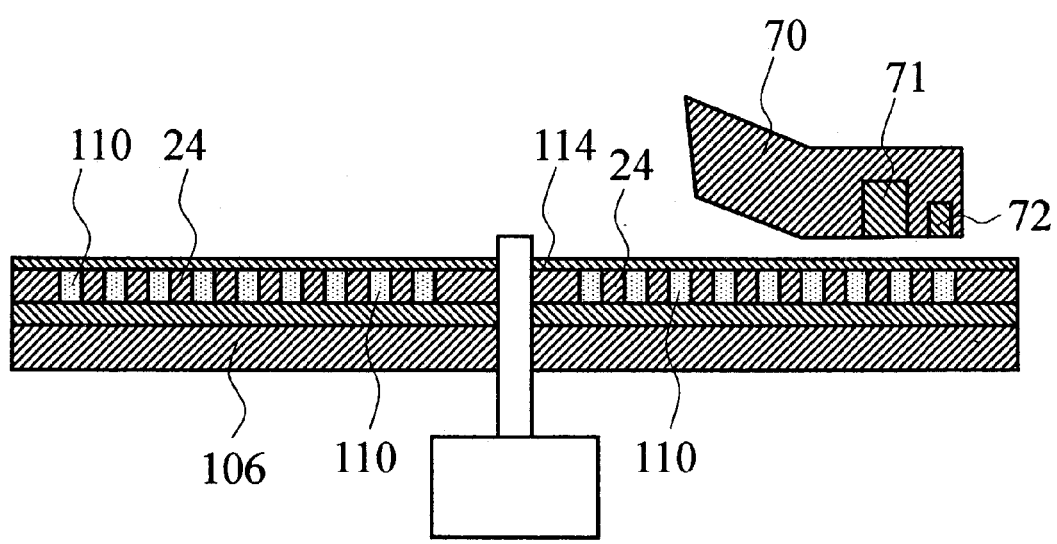
FIG. 14 is a sectional view showing the recording medium and the head slider of magnetic record playback equipment of this example.
Figure 15:
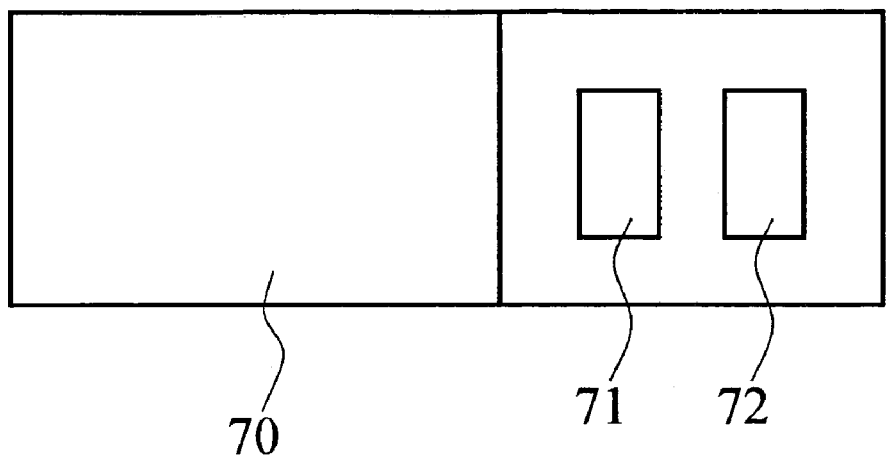
FIG. 15 is an outline figure showing the plane structure of the head slider 70.

Next, the recording-medium management system as magnetic record playback equipment which reproduces the recording medium of this example is explained, referring to FIGS. 14 and 15.

FIG. 14 is a sectional view showing the recording medium and the head slider of magnetic record playback equipment of this example.

A recording medium has the recording layer and the protection layer 114 by which the record track belt in which the magnetic body dots 24 carried out rule arrangement is formed on the glass substrate 106. The information corresponding to the address number and sector number of each record track belt is beforehand written in the magnetic layer which forms the median strip.

The read-out head 71 and the write-in head 72 are carried at the tip of the head slider 70. The head slider 70 is positioned by the two-step actuator (not shown).

FIG. 15 is an outline figure showing the plane structure of the head slider 70. About the size of the GMR read-out head 71 and the single magnetic pole write-in head 72, for example, length is about 30 nm, and width is about 20 nm.

As mentioned above, by the same technique as the second example mentioned above about the recording medium of this example using magnetic record playback equipment which was explained, when the overwrite erase pattern "01010101" is used, "key A" and "key B" are acquired. Moreover, by the RAM magnetic medium formed by copying this recording medium as it is, it has checked that it could not reproduce.

THE SEVENTH EXAMPLE

Next, as the seventh example of a the invention, a recording medium where the phase change RAM bits in which optical record is possible are provided inside the inner circumference of the recording track of the usual CD-R (Compact Disc-Recordable) by the optical lithography method, as the authentication region 20 will be explained.

Figure 16:
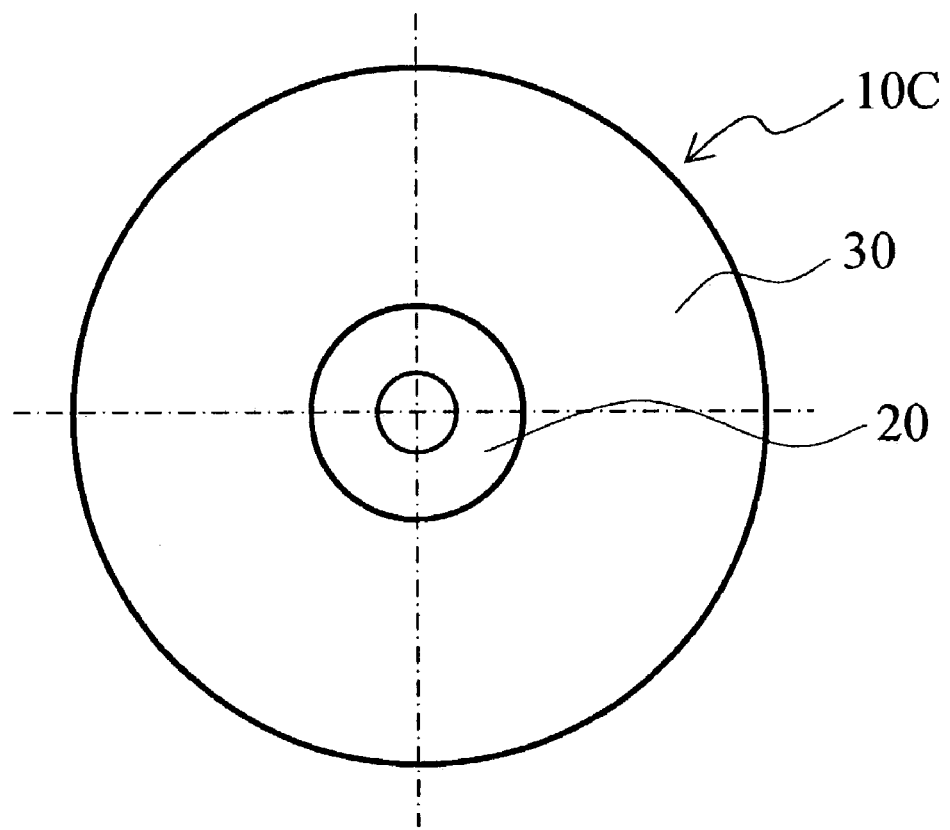
FIG. 16 is a schematic diagram showing the recording medium of this example.

FIG. 16 is a schematic diagram showing the recording medium of this example.

Firstly, the resist is applied to the region of an inner circumference only 1 mm from the data storing region 30 of the write once disc which has the same structure as commercialized CD-R.

Then, the holes of dots were formed with the bit pattern that the signal for acquiring the key of the invention by the optical lithography method to this resist film is acquired was created.

Next, phase change material In—Sb—Te is laminated to this region by the sputtering method, and the above-mentioned holes are embedded with the phase change material.

Finally, as a result of removing the whole resist film by the lift-off method, all materials other than RAM bits 24 which consist of phase change material In—Sb—Te laminated in the hole are removed, and the authentication region 20 is obtained by the inner circumference of a CD-R disc.

The bit data of the same "the key A" as the first example or the fifth example mentioned above are recorded on the authentication region 20 obtained in such a way by an optical head.

Moreover, the moving image file data encrypted by encryption processing using the "key A" formed previously and the "key B" set up separately is recorded on the recording region of this CD-R.

Heretofore, the embodiments of the present invention have been explained, referring to the examples. However, the present invention is not limited to these specific examples.

For example, the form of the recording medium of the invention is not limited in the shape of a disc which was expressed in FIG. 1A or FIG. 6, but also includes various kinds of forms, such as the shape of a card, the shape of a tape, and the shape of a film.

Figure 17:
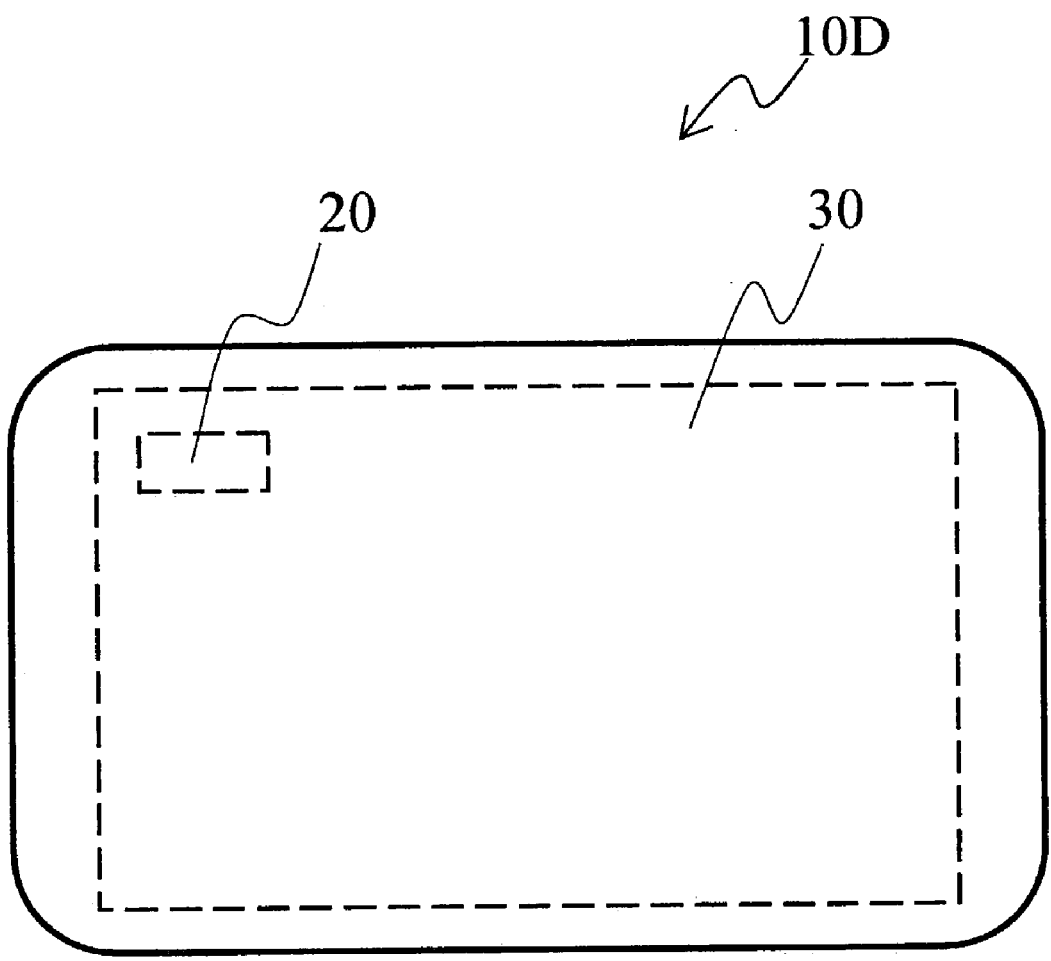
FIG. 17 is a schematic diagram which illustrates a card-like recording medium.

FIG. 17 is a schematic diagram which illustrates a card-like recording medium. That is, in recording-medium 10D shown in FIG. 17, the authentication region 20 and the data storing region 30 are provided on the surface of the card which consists of an organic material etc.

In the authentication region 20, the RAM bits and the ROM bits are put together appropriately. Moreover, in the data storing region 30, data is recorded by RAM or a ROM system. About the record reproduction system, various kinds of systems including magnetic, optical and an optical magnetism system can also be used.

Figure 18:
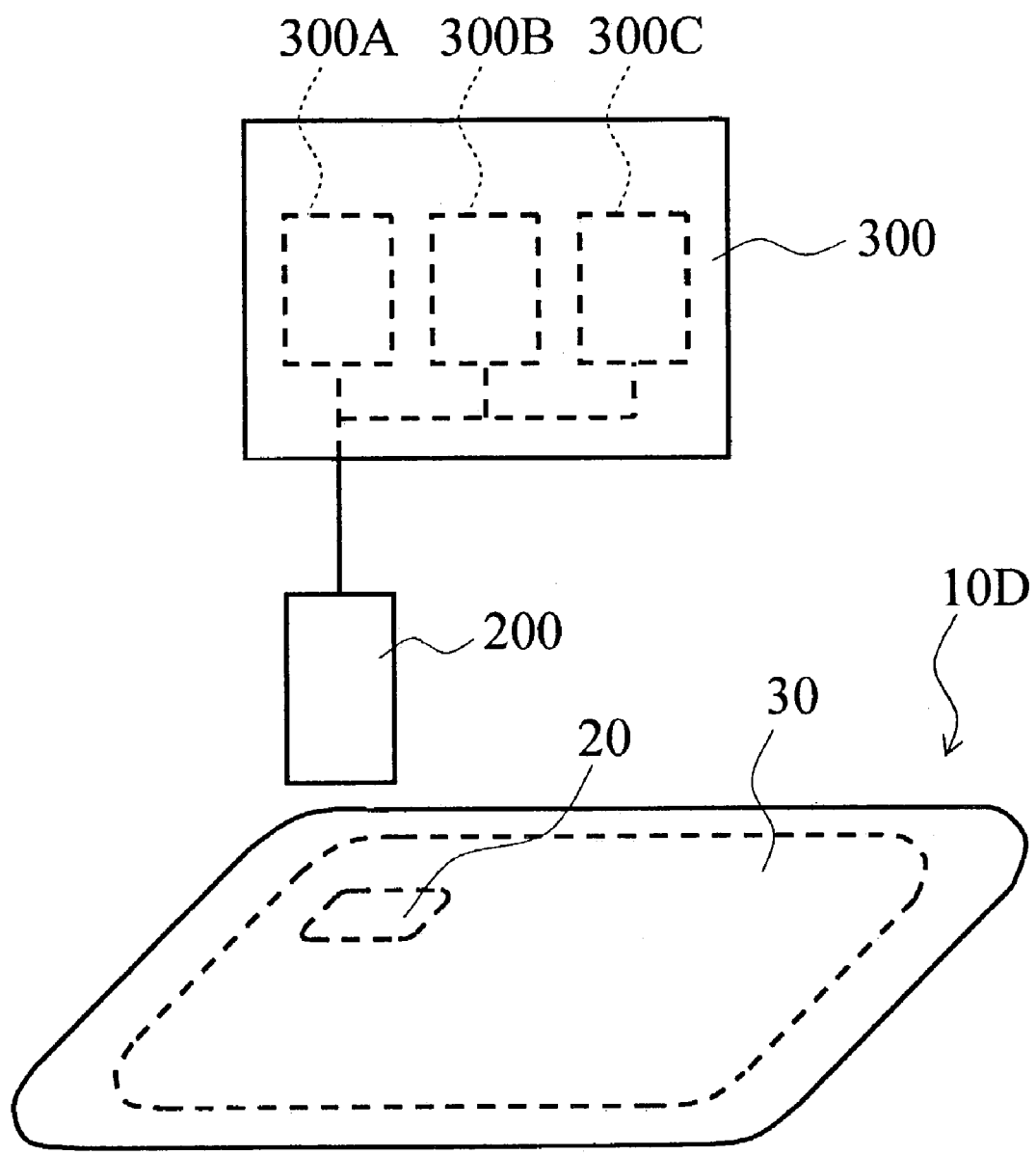
FIG. 18 is a schematic diagram showing the recording-medium management system which manages the recording medium of the shape of such a card.

FIG. 18 is a schematic diagram showing the recording-medium management system which manages the recording medium of the shape of such a card. That is, the head 200 which can appropriately perform reading and the writing of data in the authentication region 20 and the data storing region 30 of a recording medium 10 is also provided in this case.

This head 200 is controlled by the control part 300, and can perform authentication processing which consists of a series of steps which were mentioned above about FIG. 2.

Figure 19:
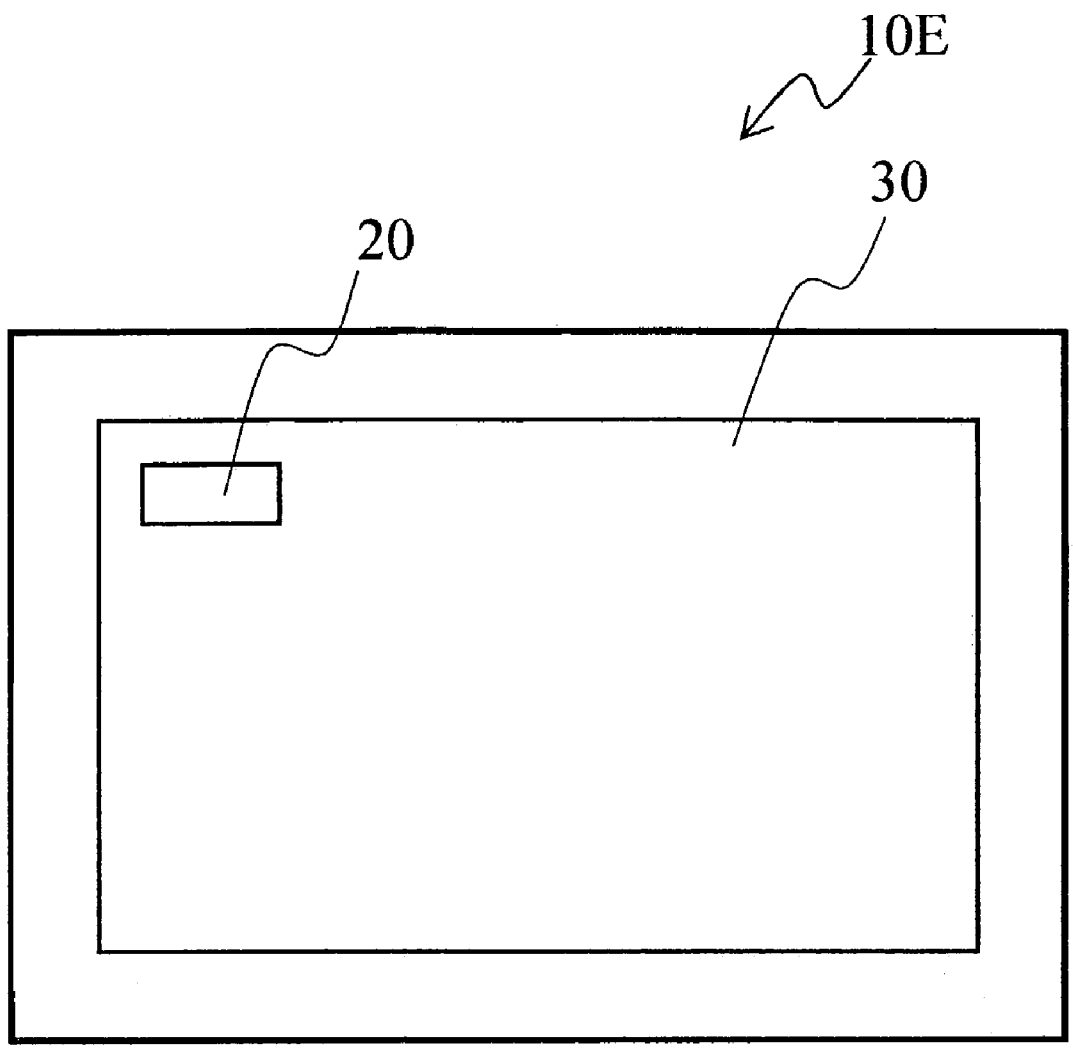
FIG. 19 is a schematic diagram showing the recording medium which used semiconductor memory and a magnetic material memory.

FIG. 19 is a schematic diagram showing the recording medium, which used semiconductor memory and a magnetic material memory.

That is, recording-medium 10E is a semiconductor memory equipment formed using semiconductors, such as silicon (Si) and gallium arsenide (GaAs), or magnetic memory equipment using magnetic effects, such as GMR (giant magnetoresistance effect) and TMR (tunneling magnetoresistance effect), and provides the authentication region 20 and the data storing region 30 are provided.

In the authentication region 20, the RAM bit which consists of a RAM type memory element, and the ROM bit which consists of a ROM type memory element are put together appropriately.

Moreover, in the data storing region 30, a RAM type memory element or a ROM type memory element is accumulated, and data is recorded by the RAM system or the ROM system.

As RAM type semiconductor memory element or magnetic memory element, DRAM (Dynamic Random Access Memory), FRAM (Ferroelectric Random Access Memory), MRAM (Magnetic Random Access Memory), $E^2$PROM (Electrically Erasable Programmable ROM), etc. can be used.

As a ROM type semiconductor memory element, SRAM (Static Random Access Memory) and a mask ROM, etc. can be used. It is possible to accumulate and form these semiconductor memory elements on a semiconductor substrate, to read out sequentially the information memorized by each memory element like the above-mentioned embodiment, and to perform authentication etc.

Figure 20:
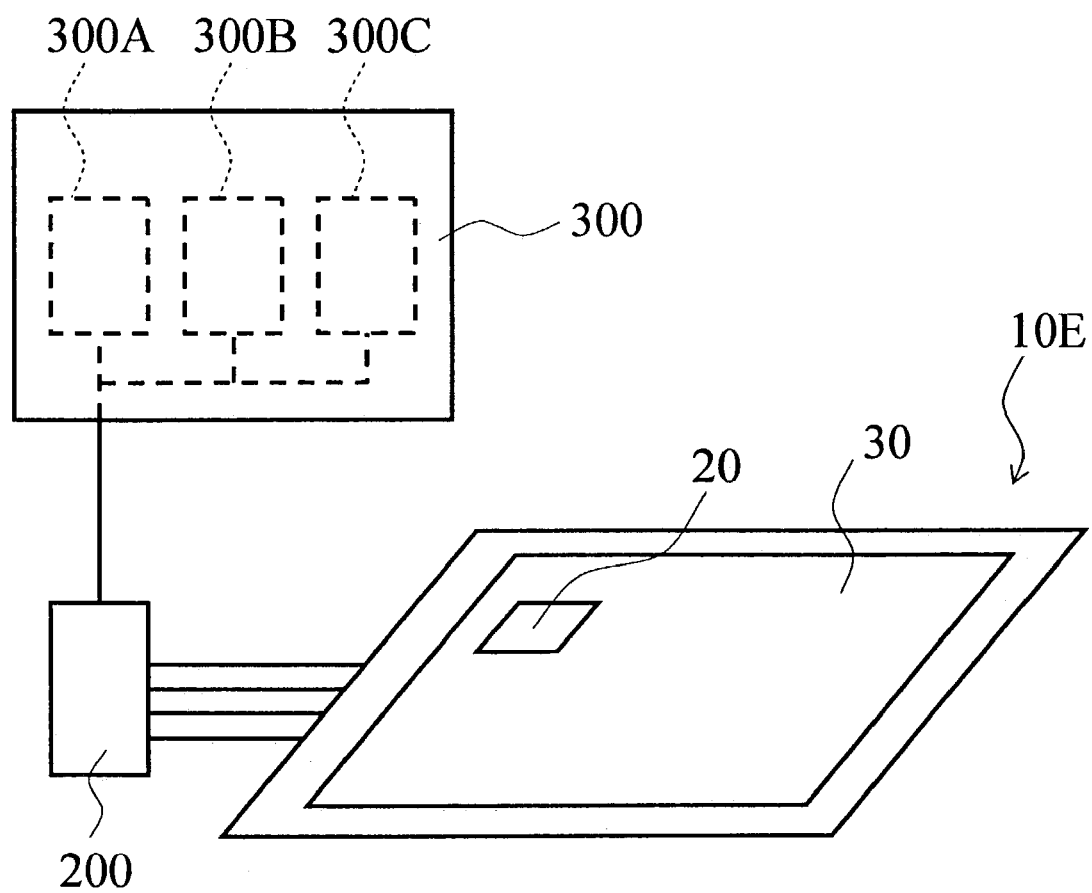
FIG. 20 is a schematic diagram showing the recording-medium management system which manages the recording medium which expressed in FIG. 19.

FIG. 20 is a schematic diagram showing the recording-medium management system which manages the recording medium which expressed in FIG. 19. That is, this management system has read-out and the write-in part 200 connected removable to recording medium 10 by the connector etc., and the control part 300 which controls this.

Read-out and the write-in part 200 have for example, the selection means for choosing either of the memory elements arranged in the shape of a matrix, the sense amplifier and the source of bias for reading (reproduction), and a voltage (current) impression means for writing in (record).

In record reproduction of recording-medium 10E, the data of the RAM bit and a ROM bit provided in the authentication region 20 is read out sequentially like the above-mentioned embodiment, "key A" is acquired, and the over-write erase of the authentication region 20 is carried out with predetermined data to after an appropriate time.

Then, "key B" is acquired by scanning the authentication region 20.

And the control part 300 can manage propriety of access to or decryption of the data storing region 30, being based on these "key A" and "key B."

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A recording medium comprising:
   an authentication region having a plurality of RAM bits and a plurality of ROM bits, the RAM bits and the ROM bits being intermingled, the RAM bit being over-writable of data at least once by a first writing condition, and the ROM bit being not over-writable of data by the first condition; and
   a data storing region.

2. The recording medium according to claim 1, further comprising a non-recording region enclosing the RAM bits and the ROM bits, and the non-recording region being not over-writable by the first writing condition.

3. A recording-medium management method comprising:
   obtaining a first data line from an authentication region of a recording medium, the authentication region including a plurality of RAM bits and a plurality of ROM bits, the RAM bits and the ROM bits being intermingled in the authentication region, the first data line corresponding to an arrangement of the RAM bits and the ROM bits, the RAM bit being over-writable of data at least once by a first writing condition, and the ROM bit being not over-writable of data by the first writing condition;
   overwriting a predetermined data to the RAM bits;
   obtaining a second data line from the recording medium, the second data line corresponding to an arrangement of the over-written RAM bits and the ROM bits, and
   decrypting an encrypted data stored in a data storing region of the recording medium in reference to the first and second data lines.

4. A recording-medium management method comprising:
   obtaining a first data line from an authentication region of a recording medium, the authentication region including a plurality of RAM bits and a plurality of ROM bits, the RAM bits and the ROM bits being intermingled in the authentication region, the first data line corresponding to an arrangement of the RAM bits and the ROM bits, the RAM bit being over-writable of data at least once by a first writing condition, and the ROM bit being not over-writable of data by the first writing condition;
   overwriting a predetermined data to the RAM bits;
   obtaining a second data line from the recording medium, the second data line corresponding to an arrangement of the over-written RAM bit bits and the ROM bits, and
   judging propriety of an access to a data storing region of the recording-medium in reference to the first and second data lines.

5. A recording-medium management system comprising:
   a reproduction part;
   a recording part; and
   a control part performing
   a first control to obtain a first data line from an authentication region of a recording medium by making the reproduction part read the authentication region, the authentication region including a plurality of RAM bits and a plurality of ROM bits, the RAM bits and the ROM bits being intermingled in the authentication region, the first data line corresponding to an arrangement of the RAM bits and the ROM bits, the RAM bit being over-writable of data at least once by a first writing condition, and the ROM bit being not over-writable of data by the first writing condition;

a second control to make the recording part overwrite predetermined data to the RAM bits;

a third control to obtain a second data line from the recording-medium by making the reproduction part read the authentication region, the second data line corresponding to an arrangement of the over-written RAM bits and the ROM bits, and a fourth control to perform an authentication with regard to the recording medium in reference to the first and second data lines.

6. The recording-medium management system according to claim 5, wherein the authentication is a decryption procedure of an encrypted data stored in the recording medium.

7. The recording-medium management system according to claim 5, wherein the authentication is a judgment of propriety of an access to a data stored in the recording medium.

8. The recording-medium management system according to claim 5, wherein the predetermined data consist of only either one of binary values.

9. The recording-medium management system according to claim 5, wherein the predetermined data has a sequence in which one of binary values and another of binary values appear by turns.

10. The recording-medium management system according to claim 5, wherein the recording medium has a plurality of the authentication regions, and the control part performs the first through fourth controls in correspondence to each of the authentication regions.

11. The recording-medium management system according to claim 10, further comprising a memory to store at least one of the obtained first and second data lines, the control part performing a fifth control to erase at least one of the first and second data lines stored in the memory.

12. The recording-medium management system according to claim 11, wherein the control part performs the fifth control when reading a data region of the recording medium corresponding to the data to be erased is performed a predetermined times.

13. The recording-medium management system according to claim 11, wherein the control part performs the fifth control when the recording medium is removed from the recording-medium management system.

14. The recording-medium management system according to claim 11, wherein the control part performs the fifth control when a predetermined time passes after the first or second data line is obtained.

15. The recording-medium management system according to claim 11, wherein the control part performs the fifth control when a use of the recording medium is finished.

16. The recording-medium management system according to claim 5, further comprising a memory to store at least one of the obtained first and second data lines, the control part performing a fifth control to erase at least one of the first and second data lines stored in the memory.

17. The recording-medium management system according to claim 16, wherein the control part performs the fifth control when reading a data region of the recording medium corresponding to the data to be erased is performed a predetermined times.

18. The recording-medium management system according to claim 16, wherein the control part performs the fifth control when the recording medium is removed from the recording-medium management system.

19. The recording-medium management system according to claim 16, wherein the control part performs the fifth control when a predetermined time passes after the first or second data line is obtained.

20. The recording-medium management system according to claim 16, wherein the control part performs the fifth control when a use of the recording medium is finished.

21. The recording-medium management system according to claim 5, wherein the control part performs a sixth control to make the recording part overwrite data to the RAM bits in order that the first data line is obtained when the first control is performed to the recording medium.

* * * * *